United States Patent
Kweon et al.

(10) Patent No.: US 9,860,792 B2
(45) Date of Patent: Jan. 2, 2018

(54) NETWORK DEVICE FOR SUPPORTING GATEWAY CHANGE IN MOBILE COMMUNICATION SYSTEM, AND METHOD FOR OPERATING SAME

(71) Applicant: Samsung Electronics Co., Ltd., Suwon-si, Gyeonggi-do (KR)

(72) Inventors: Ki-Suk Kweon, Suwon-si (KR); Jung-Shin Park, Seoul (KR); Jin-Sung Lee, Seoul (KR); Alper Yegin, Istanbul (TR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/027,390

(22) PCT Filed: Oct. 20, 2014

(86) PCT No.: PCT/KR2014/009857
§ 371 (c)(1),
(2) Date: Apr. 5, 2016

(87) PCT Pub. No.: WO2015/057035
PCT Pub. Date: Apr. 23, 2015

(65) Prior Publication Data
US 2016/0249256 A1 Aug. 25, 2016

Related U.S. Application Data

(60) Provisional application No. 61/892,725, filed on Oct. 18, 2013.

(30) Foreign Application Priority Data

Oct. 20, 2014 (KR) ........................ 10-2014-0141979

(51) Int. Cl.
*H04W 36/00* (2009.01)
*H04L 12/707* (2013.01)
(Continued)

(52) U.S. Cl.
CPC ......... *H04W 36/0005* (2013.01); *H04L 45/22* (2013.01); *H04L 45/306* (2013.01);
(Continued)

(58) Field of Classification Search
CPC . H04W 36/0005; H04W 24/02; H04W 88/16; H04L 45/22; H04L 45/306
See application file for complete search history.

(56) References Cited

U.S. PATENT DOCUMENTS

2010/0284333 A1 11/2010 Shirota et al.
2011/0019644 A1 1/2011 Cheon et al.
(Continued)

FOREIGN PATENT DOCUMENTS

| KR | 10-2011-0009382 A | 1/2011 |
| KR | 10-1065923 B1 | 9/2011 |
| KR | 10-2013-0006378 A | 1/2013 |

*Primary Examiner* — Mohammad Anwar
(74) *Attorney, Agent, or Firm* — Jefferson IP Law, LLP

(57) ABSTRACT

The present disclosure may provide an operating method for supporting gateway change in a mobile communication system. According to one aspect of the present disclosure, the method includes receiving a message requesting to consent to the gateway change from a network entity; and according to whether at least one flow requiring session continuity is set, sending a response message regarding the gateway change consent to the network entity, wherein, when the at least one flow requiring the session continuity is set, the network entity can hold the gateway change based on the response message.

20 Claims, 24 Drawing Sheets

(51) Int. Cl.
*H04L 12/725* (2013.01)
*H04W 24/02* (2009.01)
*H04W 88/16* (2009.01)
*H04W 36/12* (2009.01)
*H04W 60/00* (2009.01)

(52) U.S. Cl.
CPC ............ *H04W 24/02* (2013.01); *H04W 36/12* (2013.01); *H04W 60/00* (2013.01); *H04W 88/16* (2013.01)

(56) References Cited

U.S. PATENT DOCUMENTS

| | | |
|---|---|---|
| 2011/0170517 A1 | 7/2011 | Bakker et al. |
| 2012/0314688 A1 | 12/2012 | Taleb et al. |
| 2013/0003699 A1 | 1/2013 | Liu et al. |
| 2013/0010756 A1 | 1/2013 | Liang et al. |
| 2013/0188604 A1 | 7/2013 | Chin et al. |
| 2014/0219188 A1* | 8/2014 | Bertin ................... H04W 36/12 370/329 |

* cited by examiner

NETWORK DEVICE FOR SUPPORTING GATEWAY CHANGE IN MOBILE COMMUNICATION SYSTEM, AND METHOD FOR OPERATING SAME

CROSS-REFERENCE TO RELATED APPLICATION

This application is a National Stage application under 35 U.S.C. 371 of an International application filed on Oct. 20, 2014 and assigned application number PCT/KR2014/009857, which claimed the benefit of a Korean patent application filed on Oct. 20, 2014 in the Korean Intellectual Property Office and assigned Serial number 10-2014-014979, the entire disclosure of which is incorporated by reference.

TECHNICAL FIELD

The present disclosure relates generally to a network device for supporting gateway change in a mobile communication system, and an operating method thereof.

BACKGROUND

As smart phones are introduced and a variety of devices using a network increases rapidly, traffic throughput of a mobile communication network gradually reaches its limit. In this case, efforts are underway to reduce overload of the network using a detour.

For example, a 3rd Generation Partnership Project (3GPP) standardization group provides a solution for offloading traffic to a core network using a small cell (or a femtocell) adopted to increase cell capacity and to address a shadow area. That is, 3GPP defines a Selective IP Traffic Offload (CSIPTO) function allowing a User Equipment (UE) to use a nearby Packet Data Network (PDN) Gateway (GW) for Internet access. The CSIPTO achieves use of a shorter path to Internet, but it can also cause a problem of Internet Protocol (IP) session continuity. When the UE needs to change the GW, a flow anchored on a nearby GW (e.g., a GW in a local network) can break. The UE may need to change the GW due to its mobility. When the UE leaves a coverage area of the GW and enters a coverage area of another GW, the network can direct the GW change.

When the GW is close to the UE, it may have to change more frequently due to the mobility of the UE. When the GW is changed in the middle of a flow and the flow requires IP session continuity (e.g., a VoIP calls or a real-time video stream), the GW change can change an IP address which causes a breakage of an ongoing IP session.

Meanwhile, in order to cancel disadvantages in using a local GW, the UE need to seek for better timing and coordination of the GW change. More specifically, when the UE has a flow requiring the IP session continuity, the GW change may not be executed. 3GPP does not allow the network to blindly conduct the GW change, and the network needs to consult with the UE prior to the GW change.

Secondly, the UE can use a higher-level protocol having mobility management. For example, SIP-based flows can use SIP mobility. The SIP mobility is an end-to-end mobility protocol which can change an end-point IP address of the session through end-to-end signaling.

At the time of the GW change, when a SIP client is provided with a new IP address from a new GW while still retaining an IP address obtained from a previous GW, the flow can be switched from the previous IP address to the new IP address without service interruption by updating the end-point IP address and utilizing it as much as possible. Such a procedure requires availability of both of the previous and new GWs connected to the same PDN at the same time. However, a current standard allows activating the new GW only after the previous GW is released when both of the GWs are connected to the same PDN (as indicated by an Access Point Name (APN)).

Thus, during a transition period (until higher-layer protocols converge), a new technology for allowing using the new GW and the previous GW is demanded. SIP is given as an example of the higher-layer protocol having its own mobility management scheme. Besides, there is a plurality of other higher-layer protocols such as Stream Control Transmission Protocol (SCTP), Multipath TCP (MPTCP), mobile IP, and application specific protocols (e.g., various instant messengers).

A various embodiments of the present invention may provide a network device for supporting gateway change in a mobile communication system, and an operating method thereof.

SUMMARY

According to one aspect of the present disclosure, an operating method of a User Equipment (UE) for supporting gateway change includes receiving a message requesting to consent to the gateway change from a network entity; and according to whether at least one flow requiring session continuity is set, sending a response message regarding the gateway change consent to the network entity, wherein, when the at least one flow requiring the session continuity is set, the network entity can hold the gateway change based on the response message.

According to another aspect of the present disclosure, an operating method of a network entity for supporting gateway change includes determining whether gateway change is required; sending a message requesting to consent to the gateway change, to a UE; and according to whether at least one flow requiring session continuity is set, receiving a response message regarding the gateway change consent from the UE, wherein, when the at least one flow requiring the session continuity is set, the gateway change can be put on hold based on the response message.

According to yet another aspect of the present disclosure, an apparatus of a UE for supporting gateway change includes a receiver for receiving a message requesting to consent to the gateway change from a network entity; and a transmitter for, according to whether at least one flow requiring session continuity is set, sending a response message regarding the gateway change consent to the network entity, wherein, when the at least one flow requiring the session continuity is set, the network entity can hold the gateway change based on the response message.

According to still another aspect of the present disclosure, an apparatus of a network entity for supporting gateway change includes a controller for determining whether gateway change is required; and an interface unit for sending a message requesting to consent to the gateway change, to a UE, and according to whether at least one flow requiring session continuity is set, receiving a response message regarding the gateway change consent from the UE, wherein, when the at least one flow requiring the session continuity is set, the controller can hold the gateway change based on the response message.

According to a further aspect of the present disclosure, an operating method of a UE for supporting gateway change can include creating a Packet Data Network (PDN) connection using a first gateway; receiving an additional PDN connection request using a second gateway during the PDN connection; and setting the additional PDN connection using the second gateway by considering at least one of whether at least one flow requiring session continuity is set and whether a protocol for handing over at least one flow requiring the session continuity from the first gateway to the second gateway is supported.

As described above, the network device may control a flow requiring the IP session continuity, by holding a gateway change until at least one flow is terminated.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Hereinafter, exemplary embodiments of the present disclosure provide a network device for supporting gateway change in a mobile communication system, and an operating method thereof.

In various embodiments of the present disclosure, while the mobile communication system is a Long Term Evolution (LTE) system by way of example, the present disclosure is not limited to the LTE system and those skilled in the art can apply the present disclosure to other various mobile communication systems.

Figure 1:
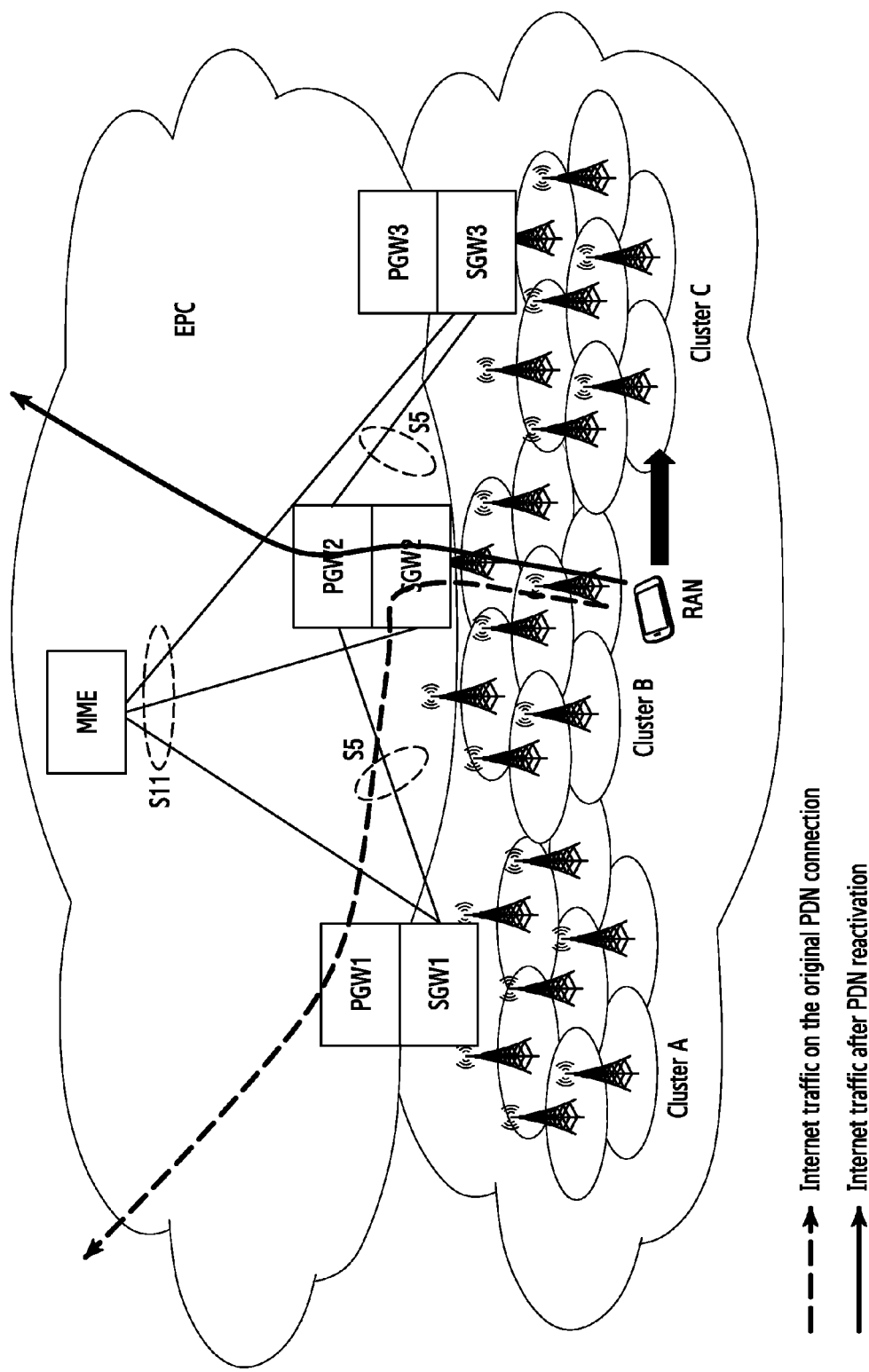
FIG. 1 depicts a diagram of a mobile communication system according to various embodiments of the present disclosure.

FIG. 1 depicts a diagram of a mobile communication system according to various embodiments of the present disclosure.

Referring to FIG. 1, the mobile communication system can include an Evolved-UTRAN (E-UTRAN) which is an access network portion, and an Evolved Packet Core (EPC) which is a core portion.

A detailed structure of E-UTRAN includes a User Equipment (UE) which is a terminal and an Evolved-NodeB (eNB) which is a base station. A detailed structure of the EPC can include a Serviing-Gateway (S-GW), a PDN-Gateway (P-GW), a Mobility Management Entity (MME), and a Home Subscriber Server (HSS) (not shown). Herein, a plurality of eNBs can be connected to one S-GW. The eNB can be referred to as a base station, and provides a radio interface to the UE and thus manages radio resource management functions such as radio bearer control, dynamic radio resource allocation, load balancing, and inter-cell interference control.

Data is delivered through the S-GW and the P-GW, and the S-GW is an end point of the E-UTRAN and the EPC and can be an anchoring point for handover between eNBs or mobile communication systems.

The P-GW performs various roles in an LTE system. Representatively, the P-GW can connect a network with an external Packet Data Network (PDN) (not shown). Besides, the P-GW can manage packet filtering, Internet Protocol (IP) routing and forwarding, IP address allocation to an UE, a Policy and Charging Enforcement Function (PCEF) function, and so on.

Components not delivering data include the MME, the HSS, and a PCRF. The HSS is a central Database (DB) containing user profiles and provides the MME with user authentication information and the user profile. The MME provides security, EPS mobility management, EPS session management, EPC bearer management, user authentication through a connection with the HSS, and a roaming function. The PCRF is a policy and charging control component and provides policy enforcement decision and control function.

The MME is a mobility management entity, and can perform inter-network mobility signaling and provide location registration of an idle UE and network selection such as SGW, PGW, and SGSN.

In various embodiments of the present disclosure, the MIME can determine whether PGW change from a first PGW to a second PGW or a third PGW is needed with respect to the UE, and process the PGW change by consulting with the UE based on flowcharts of FIG. 4 through FIG. 18.

Figure 2B:
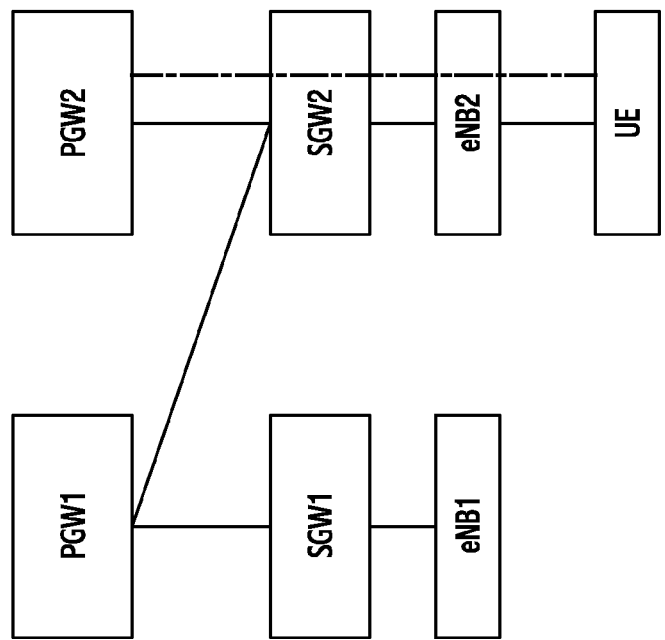
FIGS. 2A and 2B depict a gateway change scenario according to one embodiment of the present disclosure.
Figure 2A:
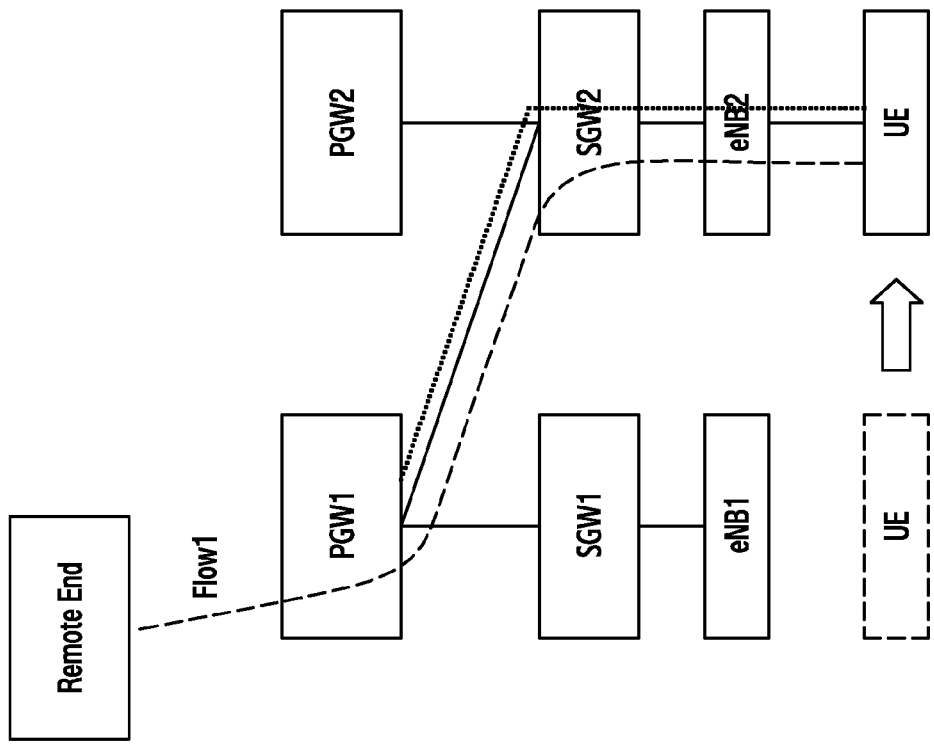

FIGS. 2A and 2B depict a GW change scenario according to one embodiment of the present disclosure.

Referring to FIG. 2A, when a UE is initially attached to a first PGW (PDN GW), the UE can be configured using a first IP address and a first PDN connection. The UE can also have a first flow with a remote end (e.g., a server or another UE connected over a backbone network). For example, the first flow is assumed to require IP session continuity.

Next, when the UE performs a handover from an eNB2 to an eNB1, the network can normally prefer to change the UE's GW from the first PGW to the second PGW. However, given a flow requiring the IP session continuity, the UE can prefer not to change its GW immediately. According to various embodiments of the present disclosure, the UE can preserve the connection with the first PGW until the first flow is terminated. Herein, it is assumed that a serving GW (the first PGW) is still connectable via a target eNB (eNB2).

When the flow holding the GW change is terminated, the network is free to change the GW. As shown in FIG. 2B, at that point, the network can terminate the PDN connection with the previous GW (the first PGW) and create a new PDN connection with a nearby GW (the second PGW).

Meanwhile, according to other various embodiments of the present disclosure, when the UE supports a higher-layer mobility protocol which can use two IP addresses during the handover, GW change using two PDN connections can be fulfilled as shown in FIG. 3.

Figure 3C:
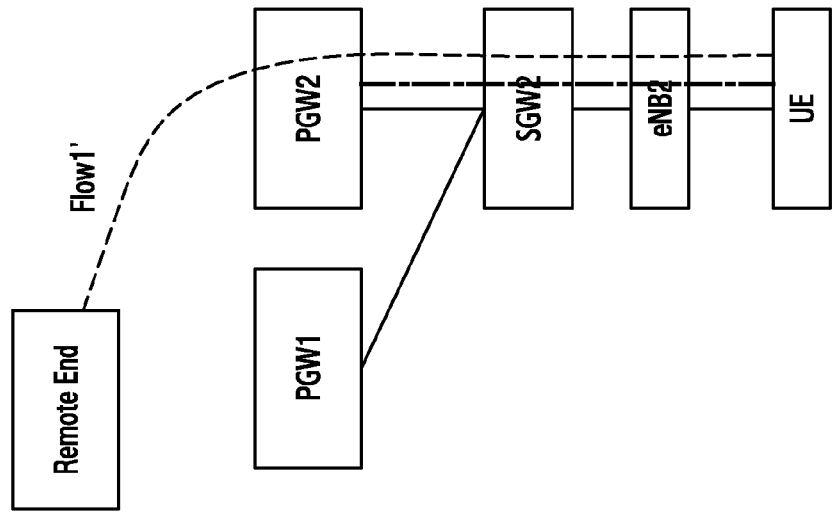
FIGS. 3A, 3B and 3C depict a gateway change scenario according to another embodiment of the present disclosure.
Figure 3B:
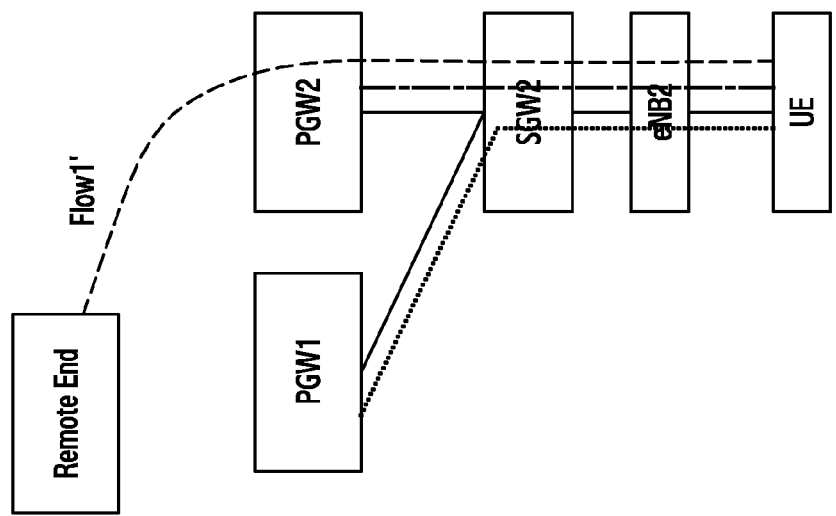
Figure 3A:
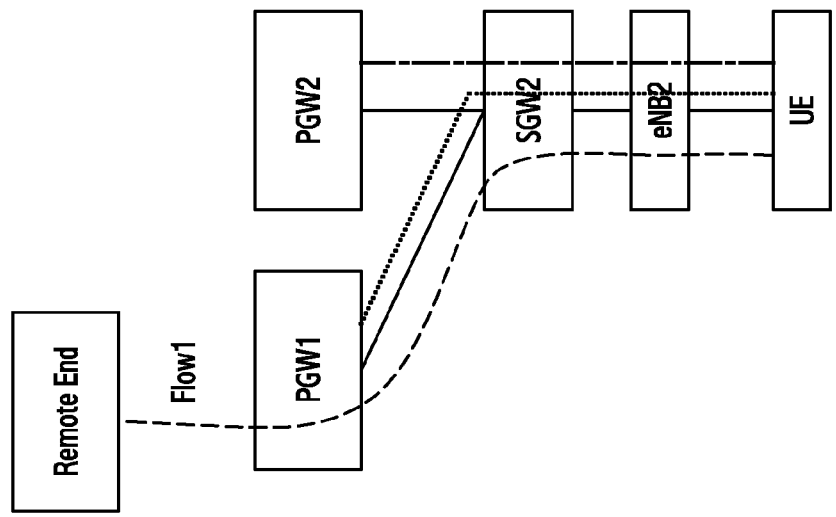

FIGS. 3A, 3B and 3C depict a GW change scenario according to another embodiment of the present disclosure.

Referring to FIG. 3A, a UE initiates a flow with a remote end while the UE uses a PDN connection via a first PGW. Although the UE moves to a second eNB connected to a second PGW which is a better PGW, the UE continues to use the first PGW. However, since the network determines that the better GW for serving the UE is the second PGW, an additional PDN connection can be created via the second PGW as shown in FIG. 3A. That is, the additional PDN connection can indicate a connection building a path of the second PGW-the second SGW-the second eNB.

When a new PDN connection (more specifically, a second IP) is available, higher-layer mobility protocol(s) on the UE can execute mobility update in order to utilize a new IP address. As a result, the flow between the UE and the remote end can migrate from the first PGW to the second PGW.

Next, when all of flows using the first PGW are terminated or migrated, the UE can terminate its PDN connection via the first PGW as shown in FIG. 3C.

Figure 4:
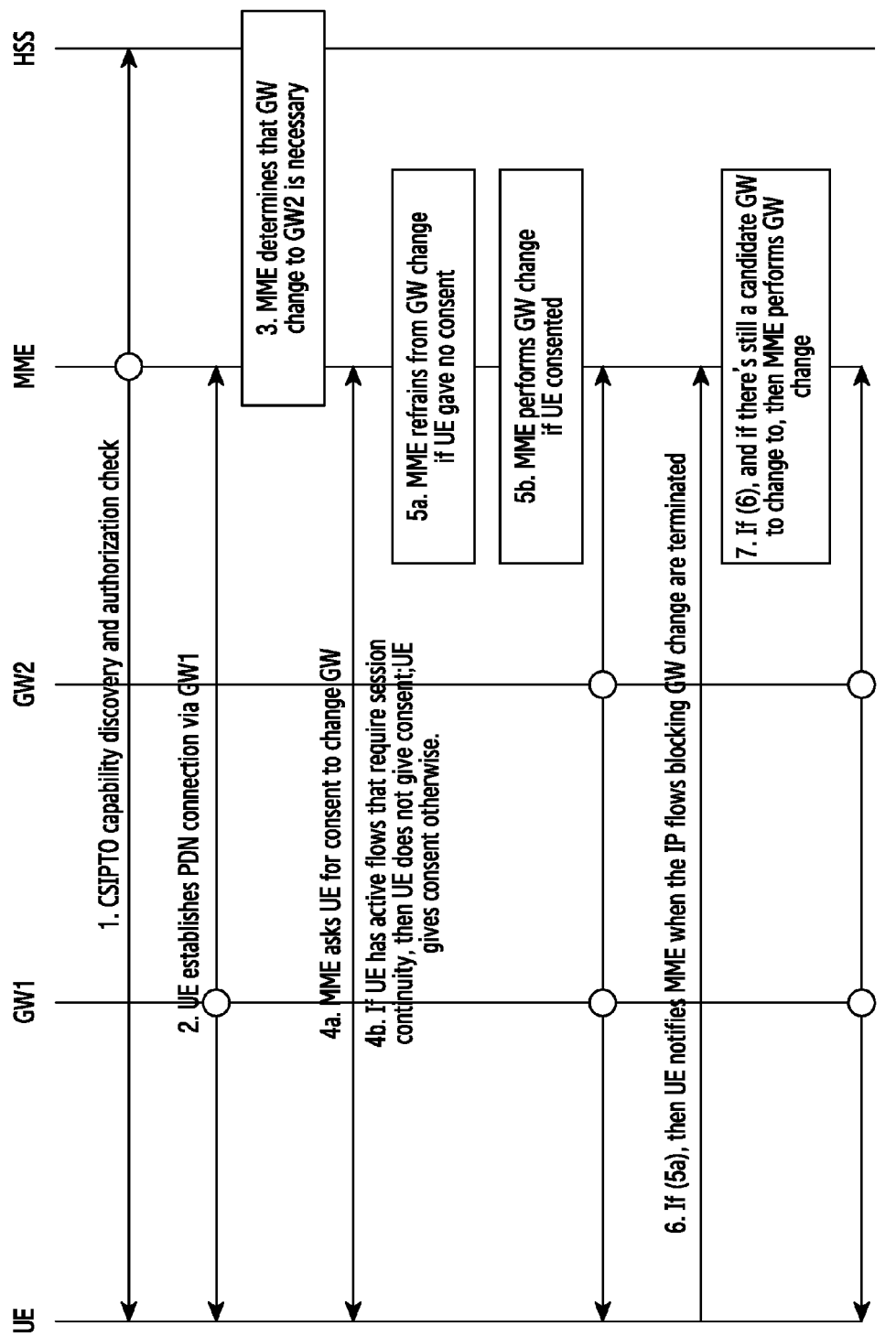
FIG. 4 depicts a flowchart of gateway change according to one embodiment of the present disclosure.

FIG. 4 depicts a flowchart of GW change according to one embodiment of the present disclosure.

Referring to FIG. 4, in step (1), a UE indicates its capability, and an MME can obtain authorization relating to a Coordinated Selected IP Traffic Offload (CCSIPTO) function. The CCSIPTO function can be a function which holds GW change until a flow requiring session continuity is terminated, and performs a GW change procedure after the flow requiring the session continuity is terminated.

For example, the UE can provide the MME with availability of the CCSIPTO function, receive authorization of the CCSIPTO function use of the UE from a HSS, and forward it to the UE.

In step (2), the UE establishes a PDN connection according to its normal PDN connection procedure. In so doing, the PDN connection can be established via a first PGW.

Next, in step (3), the MME determine whether it is better for the UE to change the GW from the first PGW to a second PGW. For example, the GW change can be needed when the UE migrates from the first eNB connected to the first PGW to the second eNB connected to the second PGW or when change to other PGW is required due to overload of the first PGW.

In step 4A, the MME can request the UE to consent to the GW change.

In step 4B, a response of a corresponding message can be transmitted from the UE to the MME. For example, when the UE has no flows requiring IP session continuity, the UE can provide its GW change consent to the MME. By contrast, when the UE has one or more flows requiring the IP session continuity, the UE can provide the MME with information indicating no consent.

Meanwhile, when the UE does not indicate the consent for the GW change, the MME may refrain from the GW change (step 5A). In other various embodiments of the present disclosure, the MME can have a reason not to honor the user's request of not changing the GW. That is, the MME can change the GW despite the UE sending no consent. This may be determined by load balancing, network operator policy, and the like.

By contrast, when the UE indicates the consent, the MME can proceed to a GW change procedure (step 5B) which terminates the PDN connection to the first PGW and creates a new PDN connection with the second PGW.

In step 4B, when the UE does not indicate the corresponding consent and flow(s) requiring the session continuity is(are) terminated, the UE can notify the result to the MME (step 6). In so doing, the MME checks whether it still has a candidate GW to change to. When having a candidate GW to change to, the MME can perform the GW change procedure (step 7). By contrast, when there is no more candidate GW, the MME can ignore a received message (i.e., the MME takes no action).

Figure 5:
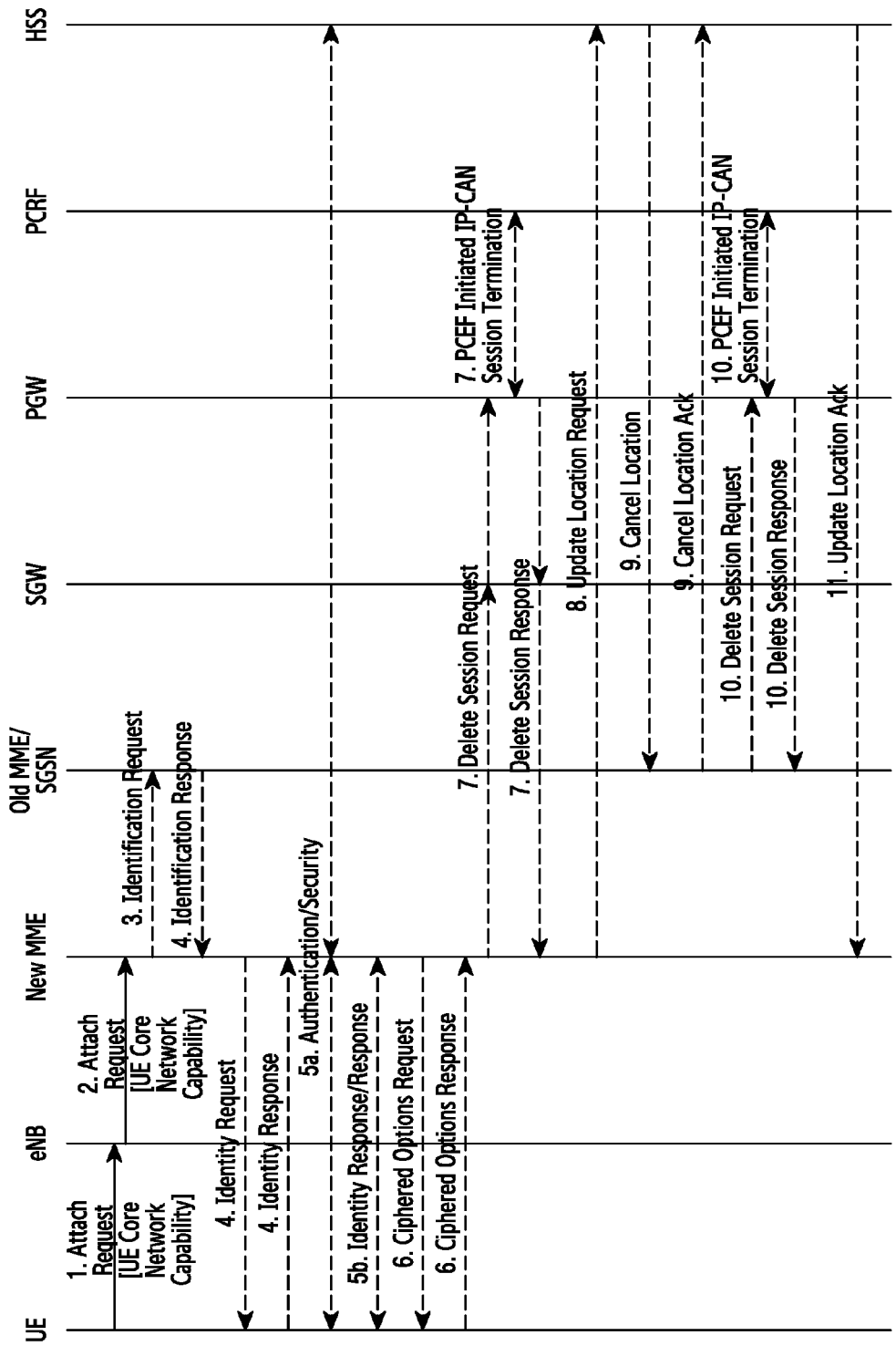
FIG. 5 through FIG. 6 depict a flowchart of an initial attach procedure according to one embodiment of the present disclosure.
Figure 6:
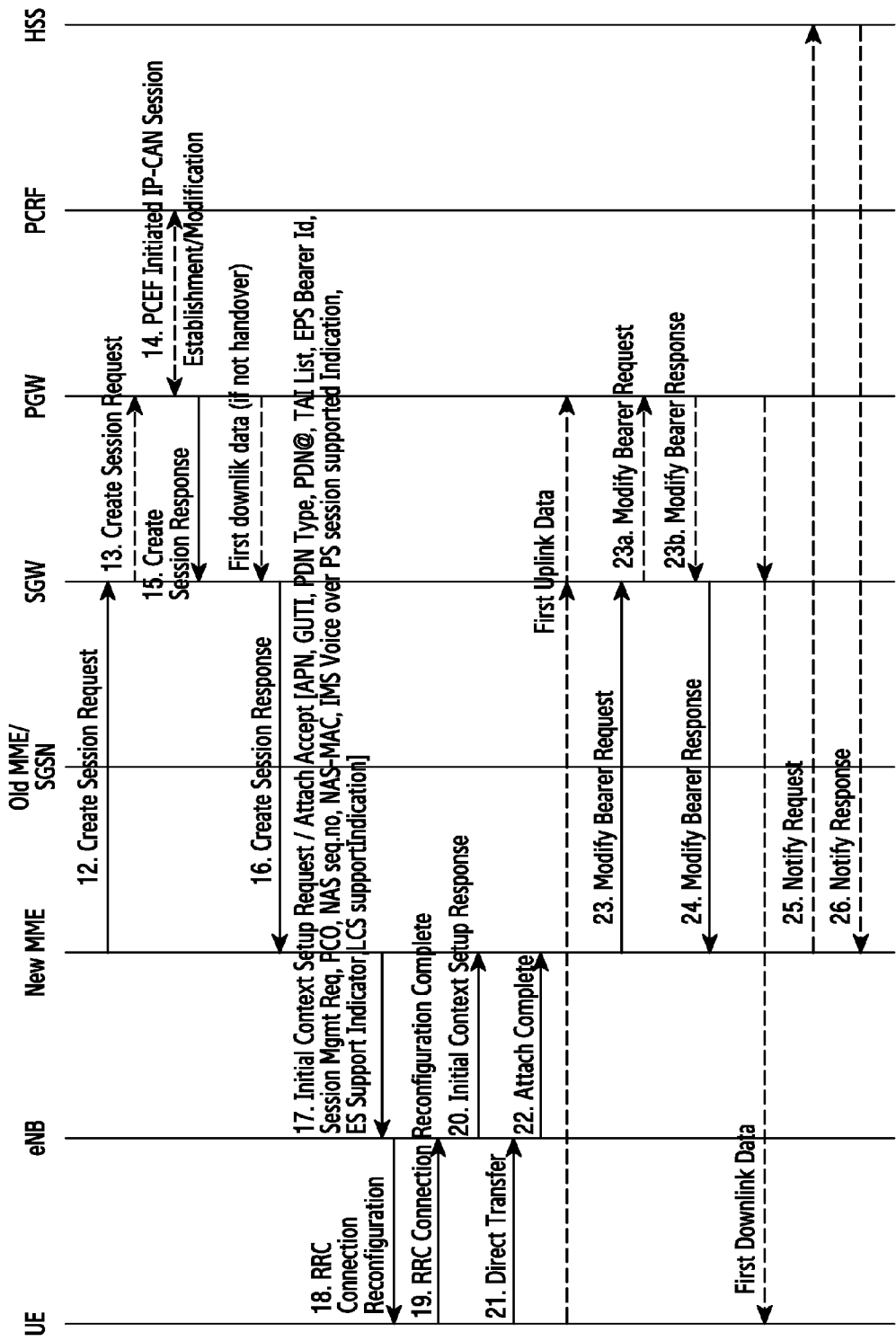

FIG. 5 through FIG. 6 depict a flowchart of an initial attach procedure according to one embodiment of the present disclosure.

Referring to FIG. 5 through FIG. 6, in order to provide a UE with ability for connecting to a GW, a network needs to know that the UE is capable of using the CCSIPTO function and is authorized to use the CCSIPTO function.

In the attach procedure, UE Core Network Capability information provided in step (1) and step (2) can include a new information element indicating that the UE supports the CCSIPTO function. This information can be carried to the MME. The MME can request UE identity and receive a response in steps (3) and (4).

In steps (5a, 5b), when the UE is authenticated by a HSS, subscription data is downloaded from the HSS to the MME. The subscription data can now include a new information element indicating whether the UE is authorized to use sticky PDN (the GW change according to the embodiment of FIG. 2). Also, authorization of additional types of the CSIPTO function is conveyed in the same data such as transient duel PDN (the GW change according to the embodiment of FIG. 3).

When the UE supports the CSIPTO function, the UE can use various CSIPTO extensions when the HSS gives the authorization for the CSIPTO function.

By contrast, when the UE does not support the CSIPTO function, the UE can use neither of the CSIPTO extensions even though the HSS gives the authorization to the UE.

Next steps (step 6 through step 26) of the attach procedure are the same as procedures defined in 3GPP standard, and thus their detailed explanations shall be omitted.

Figure 7:
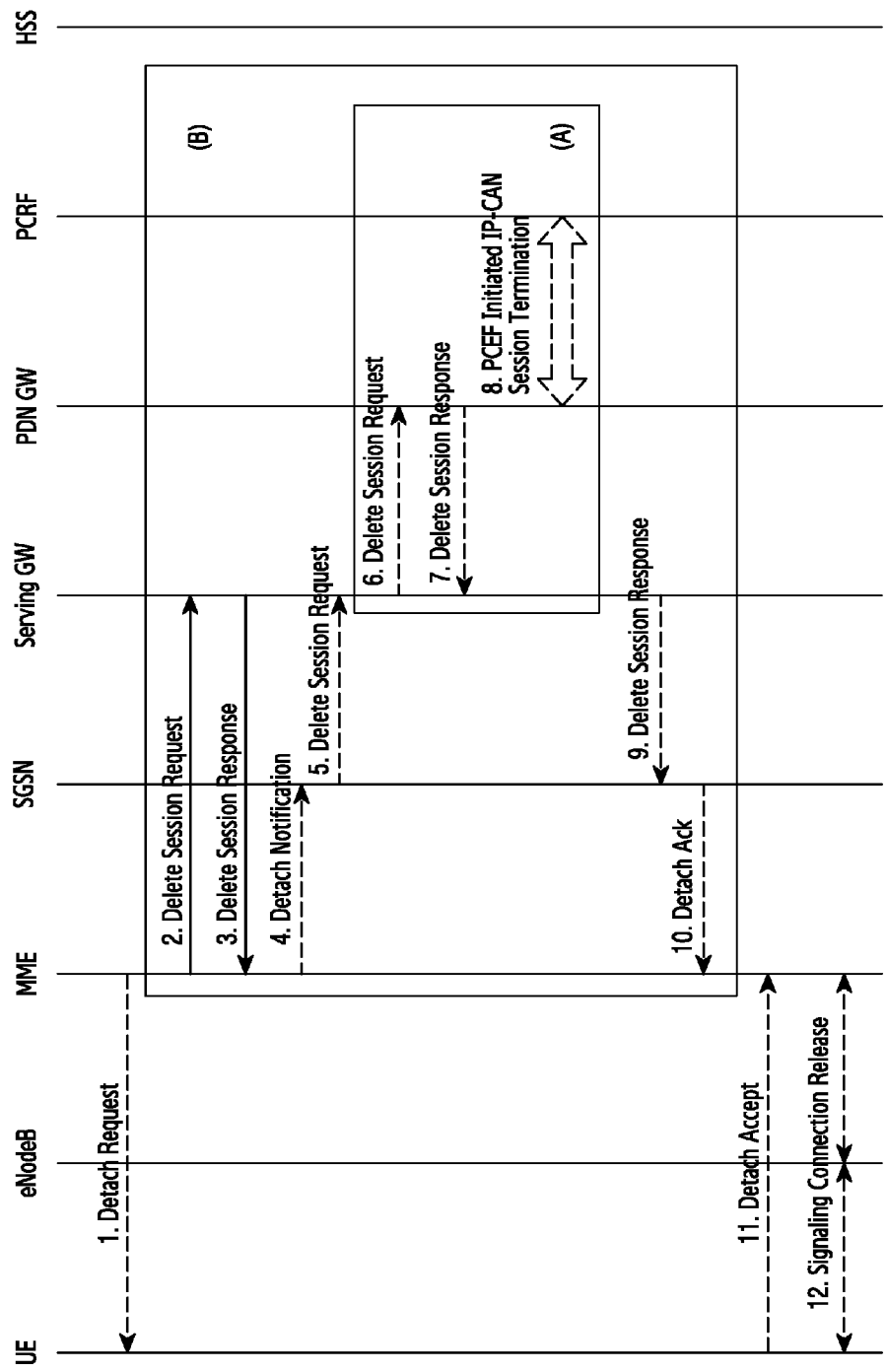
FIG. 7 depicts a flowchart of a detach procedure initiated by a standard Mobility Management Entity (MME) according to various embodiments of the present disclosure.

FIG. 7 depicts a flowchart of a detach procedure initiated by a standard MME according to various embodiments of the present disclosure.

The detach procedure of FIG. 7 is the same as a detach procedure defined in 3GPP standard and thus its detailed explanations shall be omitted.

Figure 8:
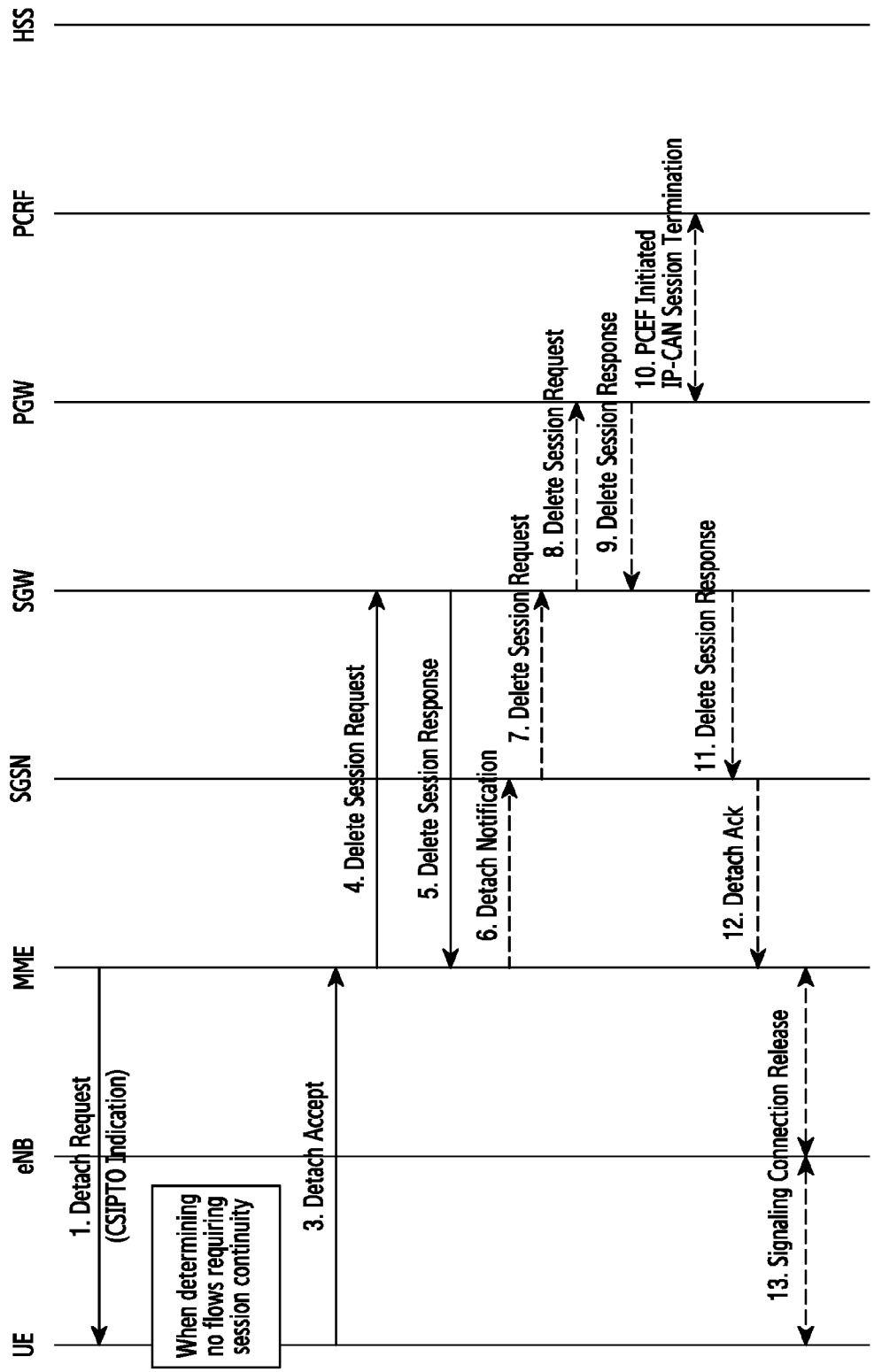
FIG. 8 depicts a flowchart of an MME-initiated detach procedure according to one embodiment of the present disclosure.

FIG. 8 depicts a flowchart of an MME-initiated detach procedure according to one embodiment of the present disclosure.

Referring to FIG. 8, when an MME offers GW change to a UE, an extended detach procedure determines that the UE has no flows requiring session continuity.

For example, when the UE is CSIPTO function capable and authorized for the CSIPTO function and the MME detects a better GW to change to, the MME sends a detach request to the UE (step 1). The detach request can include CSIPTO indication requesting the UE's consent for the GW change.

When the UE determines that there is no active flow requiring the IP session continuity (step 2), the UE can send a detach accept to the MME (step 3). Remaining steps of the detach procedure can be executed according to the detach procedure of FIG. 7.

Figure 9:
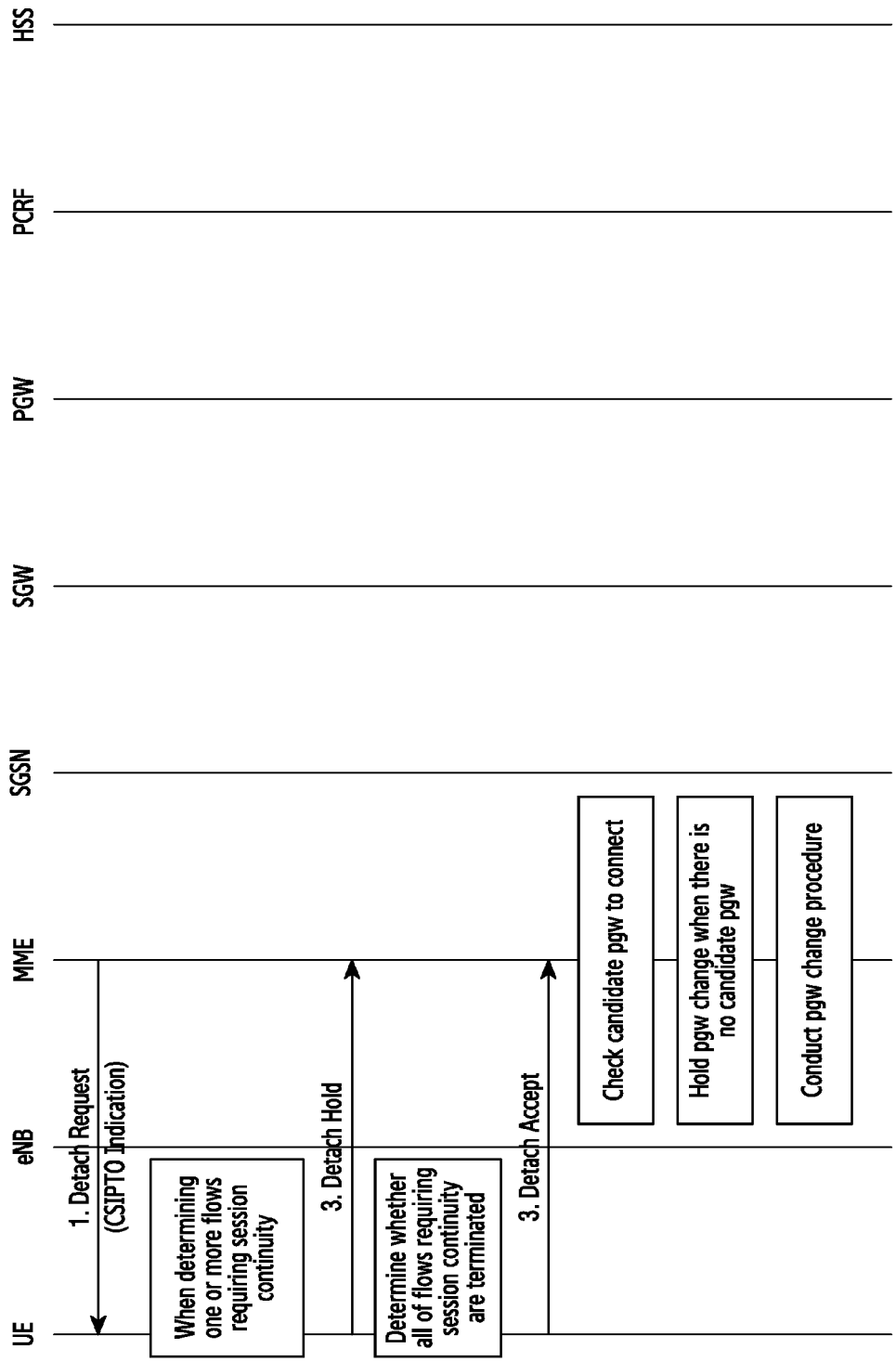
FIG. 9 through FIG. 10 depict a flowchart of an MME-initiated detach procedure according to one embodiment of the present disclosure.
Figure 10:
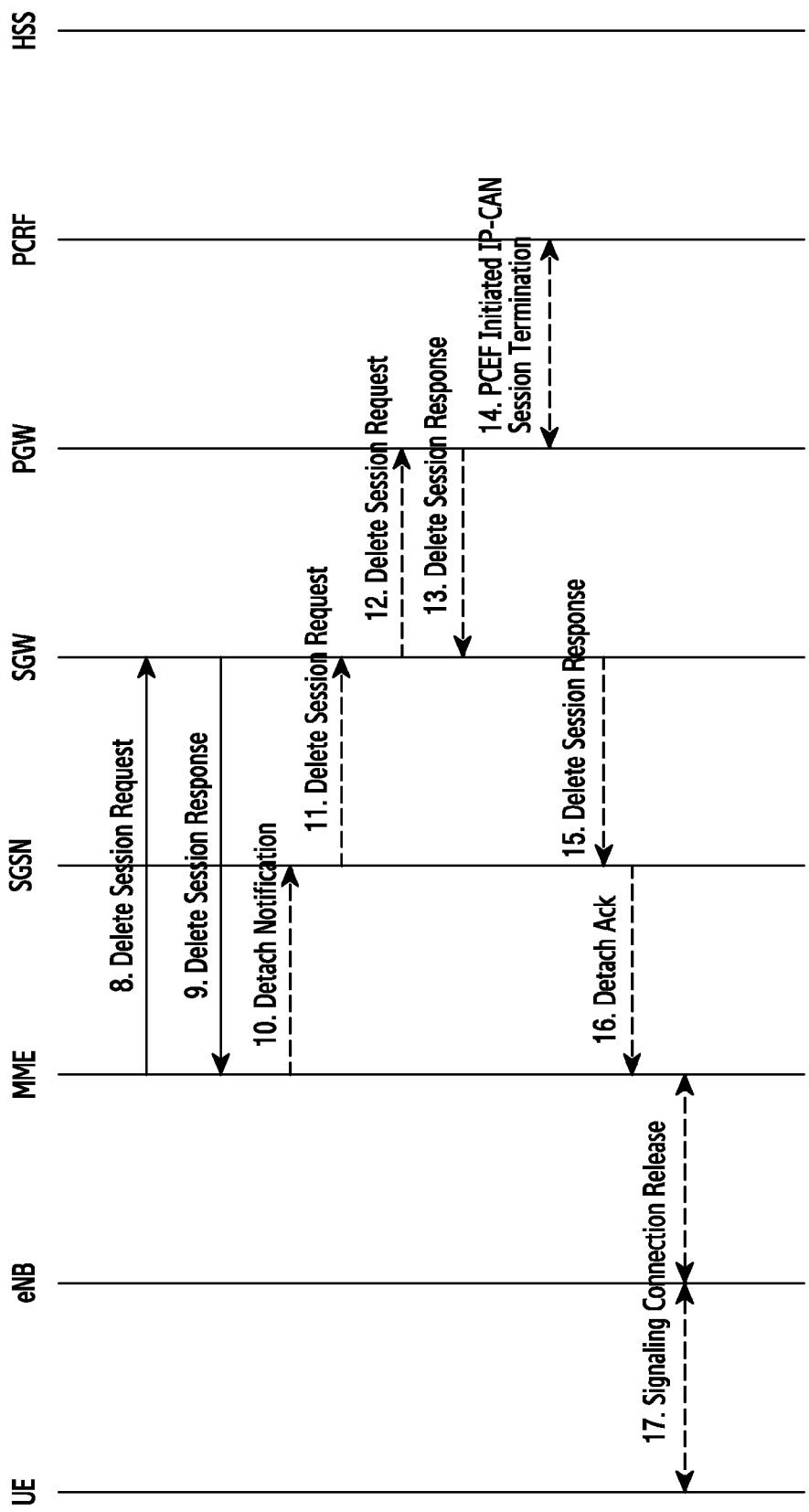

FIG. 9 through FIG. 10 depict a flowchart of an MME-initiated detach procedure according to one embodiment of the present disclosure.

Referring to FIG. 9 through FIG. 10, when the MME offers GW change to a UE, an extended attach procedure determines that the UE has one or more flows requiring session continuity.

In this case, when the UE has one or more flows requiring the session continuity (step 2), the UE can send a detach holding message (step 3), instead of sending an immediate detach accept message to the MME. At this point, the UE notifies no GW change attempt to the MME through the detach holding message.

When detecting no more flow requiring the session continuity in step 4, the UE sending the detached holding message can send a detach accept message in step 5. When receiving the detach accept message, the MME checks whether there still exists a candidate GW to change to in step 6. When there is no such a GW, the MME can terminate the GW change execution in step 7a. By contrast, when there is such a GW to change to, the MME can proceed to a regular detach procedure (step 7b).

Remaining steps of the detach procedure can be executed according to the detach procedure of FIG. 7.

Figure 11:
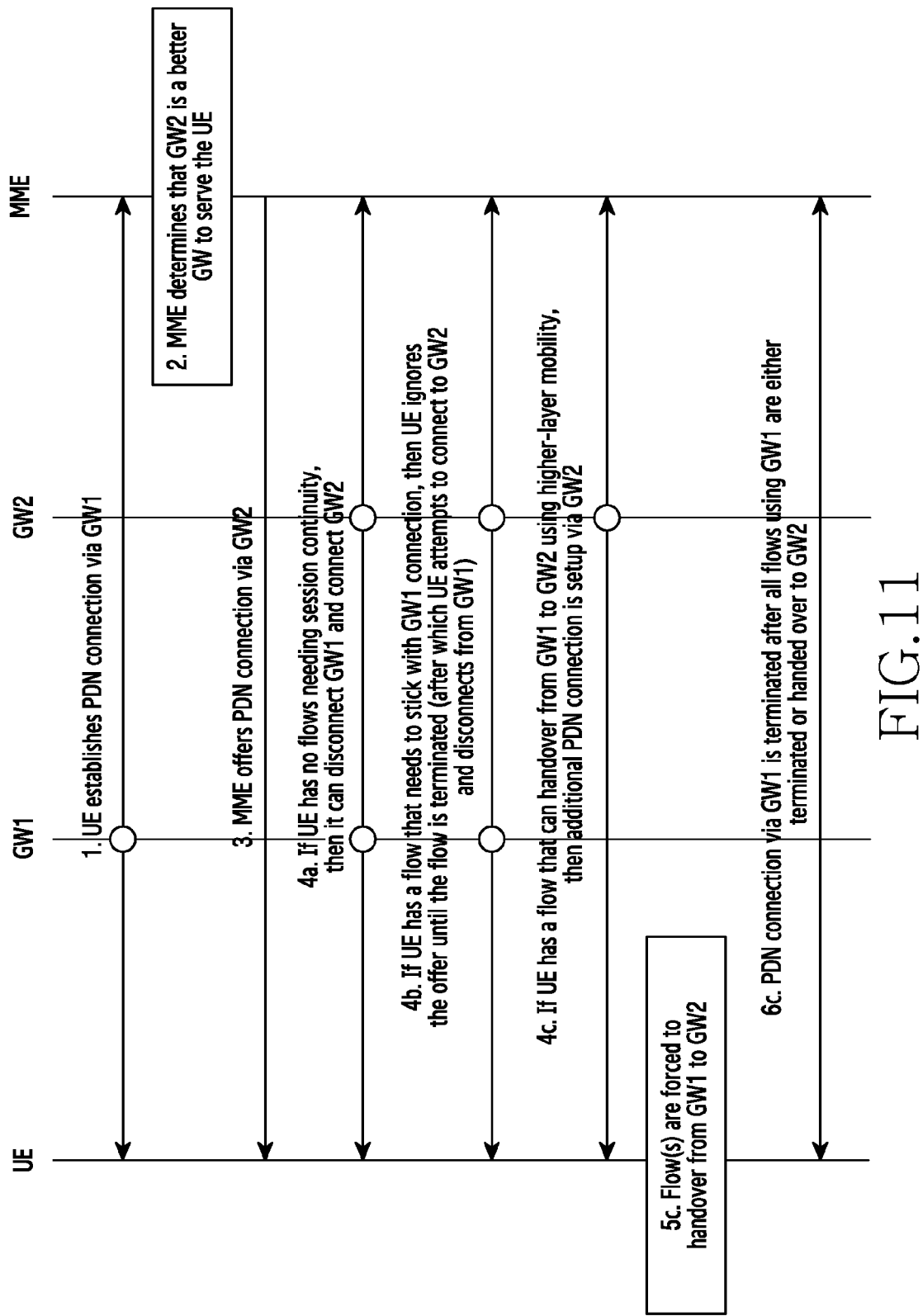
FIG. 11 depicts a flowchart of gateway change according to another embodiment of the present disclosure.

FIG. 11 depicts a flowchart of GW change according to another embodiment of the present disclosure.

Referring to FIG. 11, in step 1 of the procedure, a UE can establish a PDN connection via a first PGW.

In step 2, when the MME determines that there is a better GW to serve the UE, the MME can offer the PDN connection with the better GW to the UE in step 3. For example, the MME can offer the PDN connection via the first PGW to the UE.

When the UE has no active flows requiring session continuity, the UE can immediately perform GW change from the first PGW to a second PGW (case (A), see FIG. 16 below) in step 4a.

By contrast, when the UE has one or more flows which require session continuity but cannot utilize higher-layer mobility protocols, the UE can ignore the MME offer for those flows until such flows are terminated (until the PDN connection via the first PGW is terminated and the UE establishes a PDN connection with the second PGW) (case (b), see FIG. 17 below).

Alternatively, when the UE has one or more flows which can perform higher-layer mobility management using an IP address from the PDN connection offered to the MME, the UE can establish an additional PDN connection via the second PGW in step 4c. Next, in step 5c, the UE can force the flow to hand over from the first PGW to the second PGW. Finally, when all such flows are handed over to the second PGW or terminated, the UE can release the PDN connection via the first PGW (case (c), see FIG. 18 below).

Figure 12:
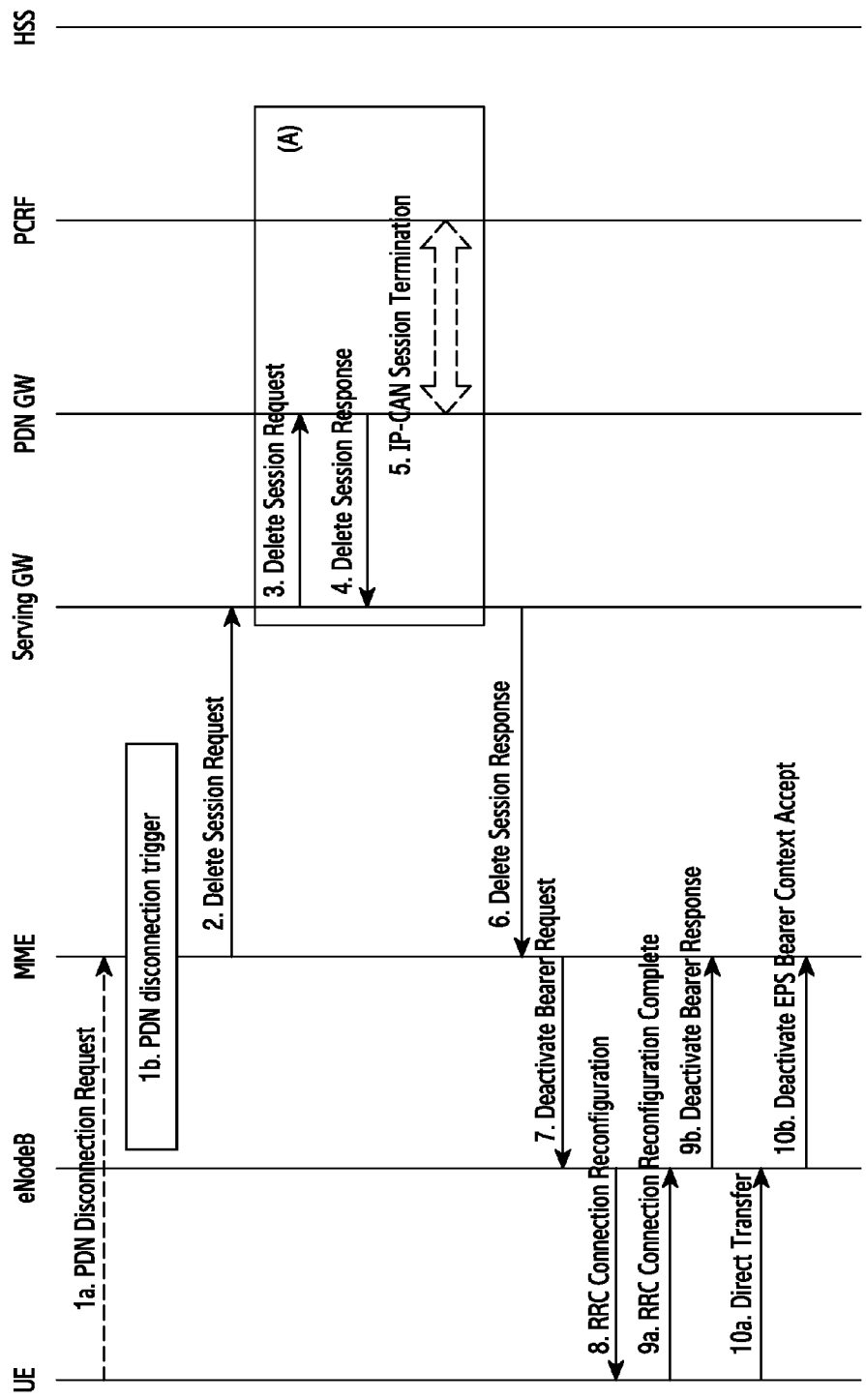
FIG. 12 depicts a flowchart of a standard UE request Packet Data Network (PDN) disconnection procedure according to various embodiments of the present disclosure.

FIG. 12 depicts a flowchart of a standard UE request PDN disconnection procedure according to various embodiments of the present disclosure.

The PDN disconnection procedure of FIG. 12 is the same as a PDN disconnection defined in 3GPP standard and thus its detailed explanations shall be omitted.

For reference, the detach procedure is used when there is only one PDN connection to change, and the PDN disconnection procedure is used when there is a plurality of PDN connections.

Figure 13:
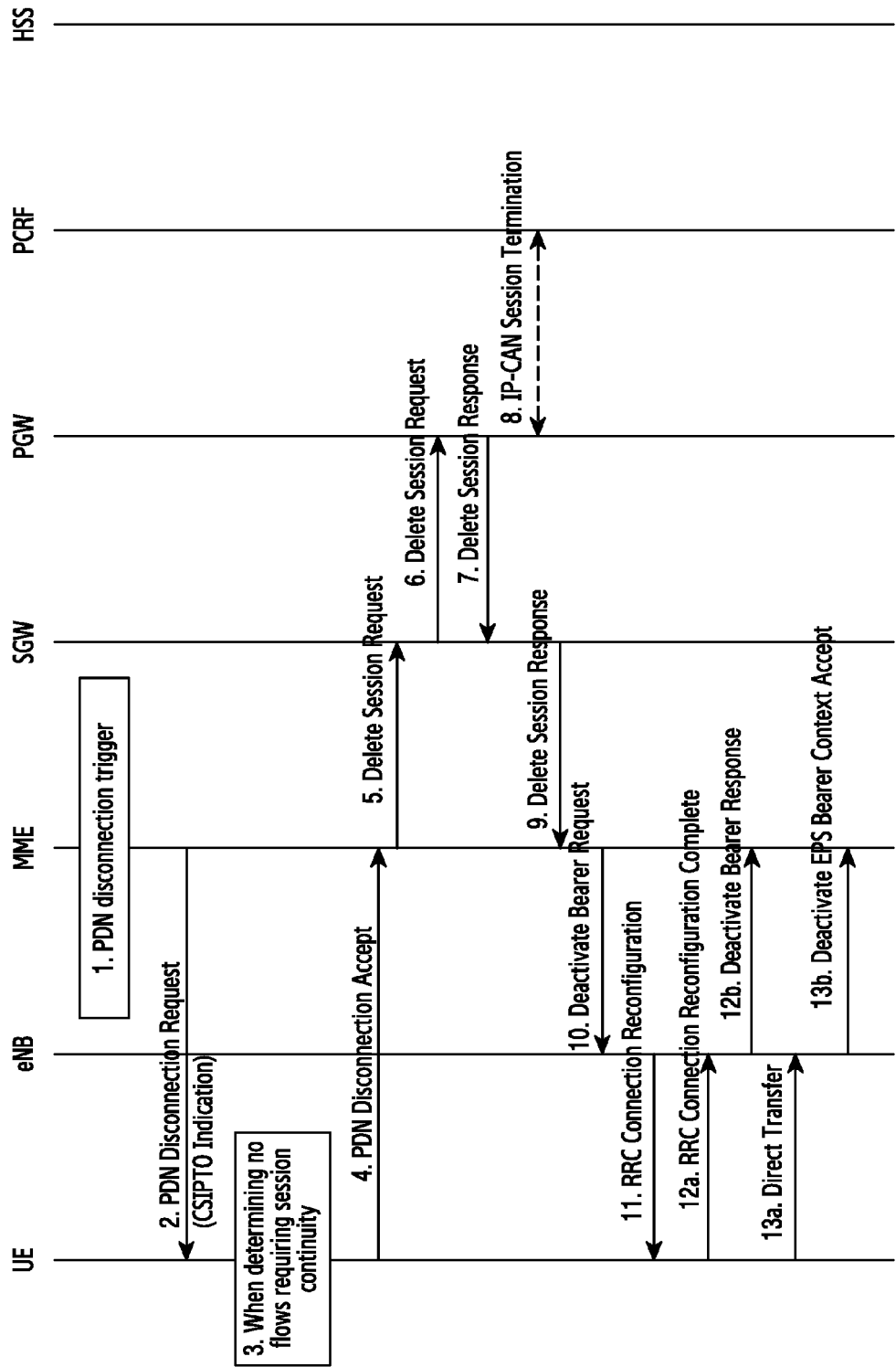
FIG. 13 depicts a flowchart of an extended PDN disconnection procedure according to another embodiment of the present disclosure.

FIG. 13 depicts a flowchart of an extended PDN disconnection procedure according to another embodiment of the present disclosure.

FIG. 13 depicts the extended PDN disconnection procedure where the UE determines no flows requiring session continuity when an MME offers GW change. The PDN disconnection procedure follows a PDN connection procedure for GW change.

When the MME discovers that the UE is CSIPTO function capable and authorized for the CSIPTO function and the MME discovers a better GW for the UE in step 1, the MME sends a PDN disconnection request including a CSIPTO indication to the UE in step 2.

When the UE determines that there is no active flow requiring IP session continuity in step 3, the UE sends a PDN disconnection accept message to the MME in step 4 and thus executes the PDN disconnection procedure according to the current standard. Hence, descriptions of detailed step 5 through step 13 shall be omitted.

Figure 14:
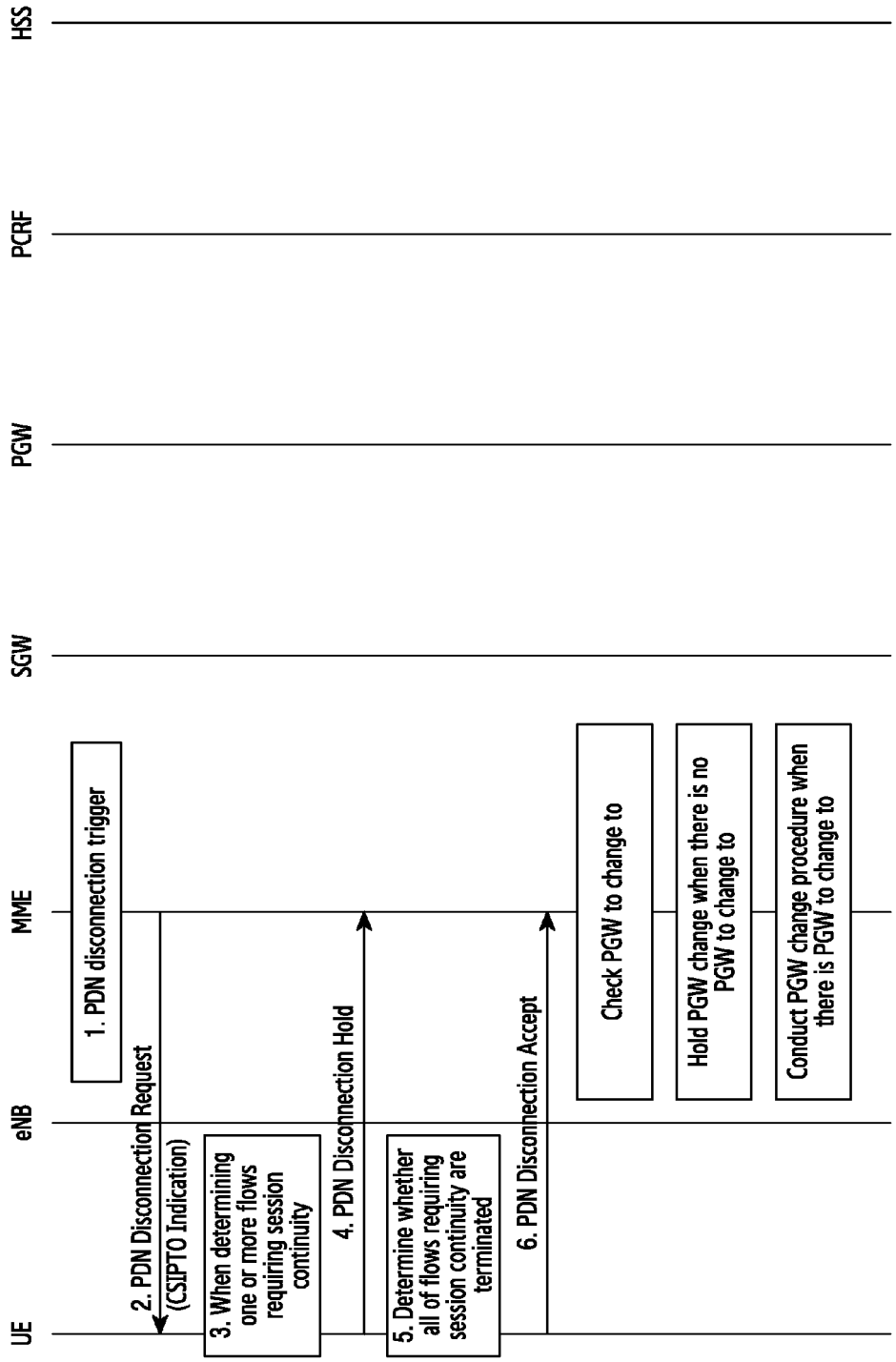
FIG. 14 through FIG. 15 depict a flowchart of an extended PDN disconnection procedure according to various embodiments of the present disclosure.
Figure 15:
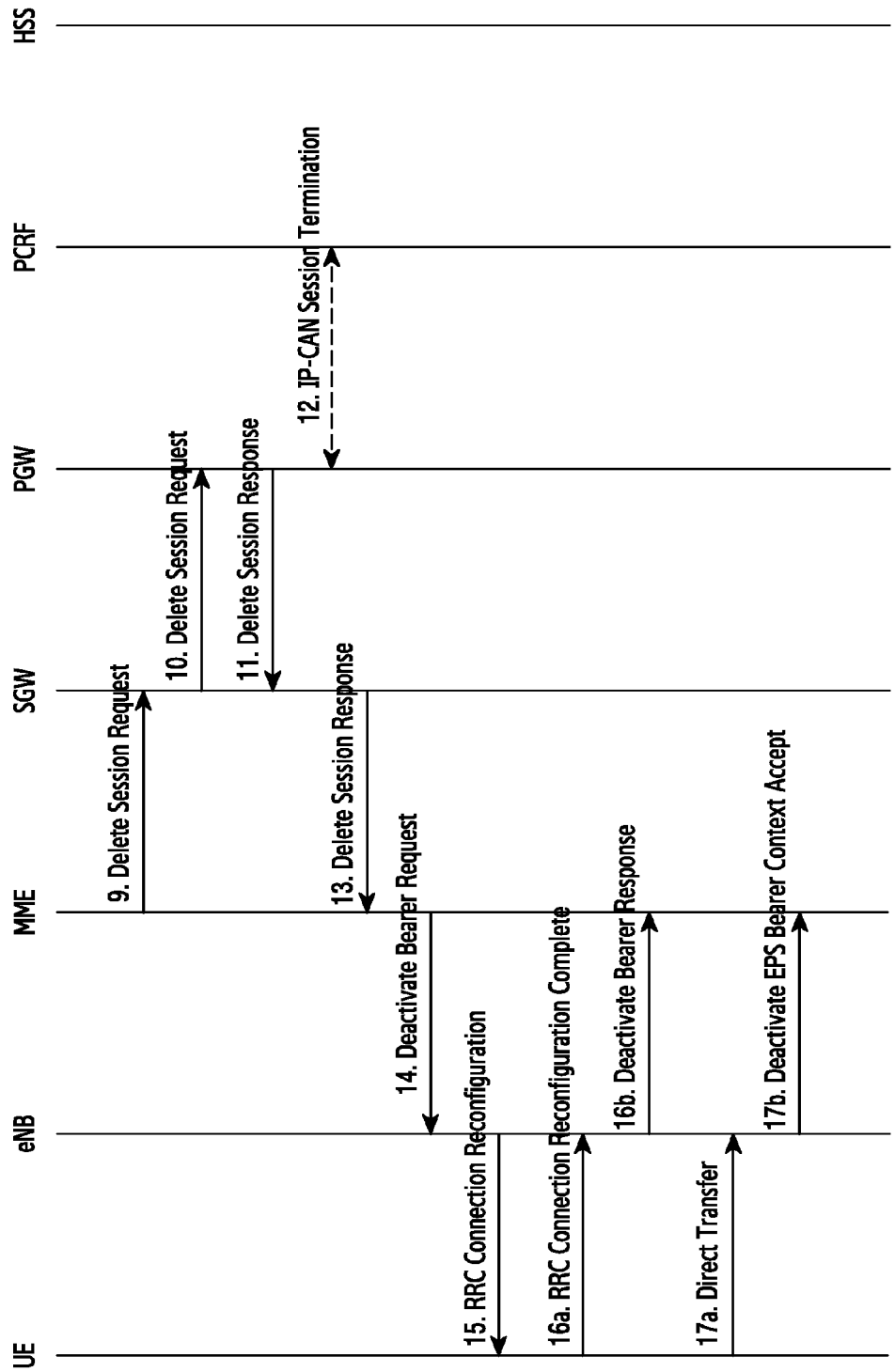

FIG. 14 through FIG. 15 depict a flowchart of an extended PDN disconnection procedure according to various embodiments of the present disclosure.

FIG. 14 depicts the extended PDN disconnection procedure where a UE determines one or more flows requiring session continuity when the MME offers GW change.

For example, when the MME knows that the UE is CSIPTO function capable and authorized for the CSIPTO function and the MME discovers a better GW for the UE in step 1, the MME sends a PDN disconnection request including CSIPTO indication to the UE in step 2.

When the UE determines there are one or more active flows requiring the IP session continuity in step 3, the UE can send a PDN disconnection hold message to the MME in step 4. The PDN disconnection hold message from the UE tells the MME to hold the GW change.

When the UE detects no flows requiring the IP session continuity in step 5, the UE sends a PDN disconnection accept message to the MME in step 6. When receiving the PDN disconnection accept message, the MME checks whether there still exists a candidate GW to change to in step 7. When there is no candidate GW to change to, the MME terminates the GW change execution (step 8a). By contrast, when there is a candidate GW to change to, the MME performs the regular PDN disconnection procedure (step 8b).

Next, the steps of the PDN disconnection procedure are the same as the standard procedure and thus their detailed explanations shall be omitted.

Figure 16:
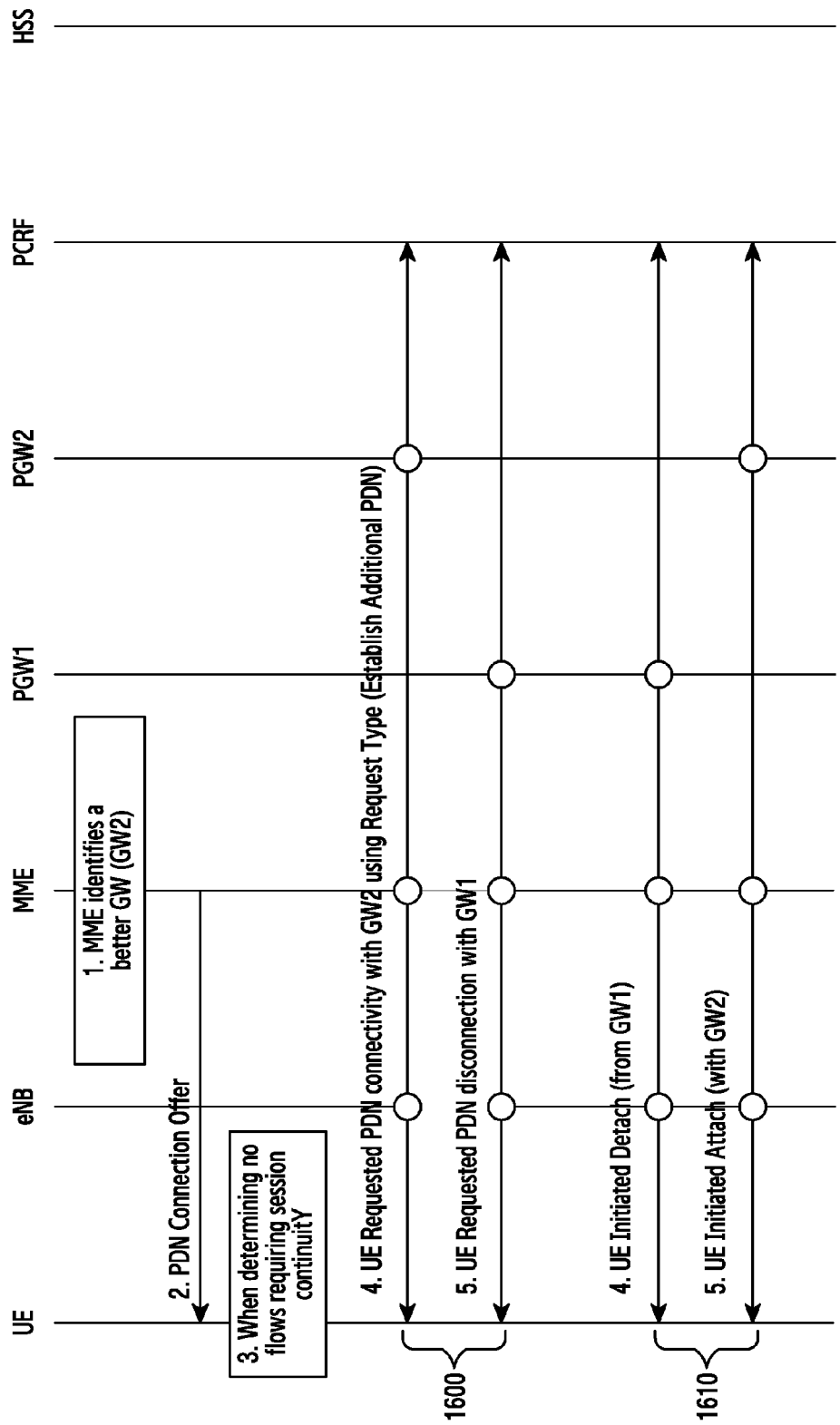
FIG. 16 depicts a flowchart of gateway change when a UE has no flow requiring session continuity during an extended PDN disconnection procedure according to various embodiments of the present disclosure.

FIG. 16 depicts a flowchart of GW change when a UE has no flow requiring session continuity during an extended PDN disconnection procedure according to various embodiments of the present disclosure.

Referring to FIG. 16, when an MME determines a better GW for serving a UE in step 1, the MME sends a PDN connection offer message to the UE in step 2 in order to offer a new PDN connection.

In step 3, when determining no flows requiring session continuity, the UE can terminate the PDN connection with a first PGW and establish a new PDN connection with the second PGW.

Next, in steps 4 and 5, when there are one or more PDN connections at the point of this operation, UE requested PDN connection (second PGW) and UE requested PDN disconnection (first PGW) procedures are used according to the standard. In so doing, when PDN connection is requested, information indicating establishment of additional PDN can be included. The information can inform the MME that the UE will establish a connection with an offered GW. A new GW can use the same PDN (i.e., the same Access Point Name (APN)) as one or more other GWs currently used.

In various embodiments, the UE can detach from the first PGW and attach to the second PGW using the standard attach and detach procedures (1610).

Figure 17:
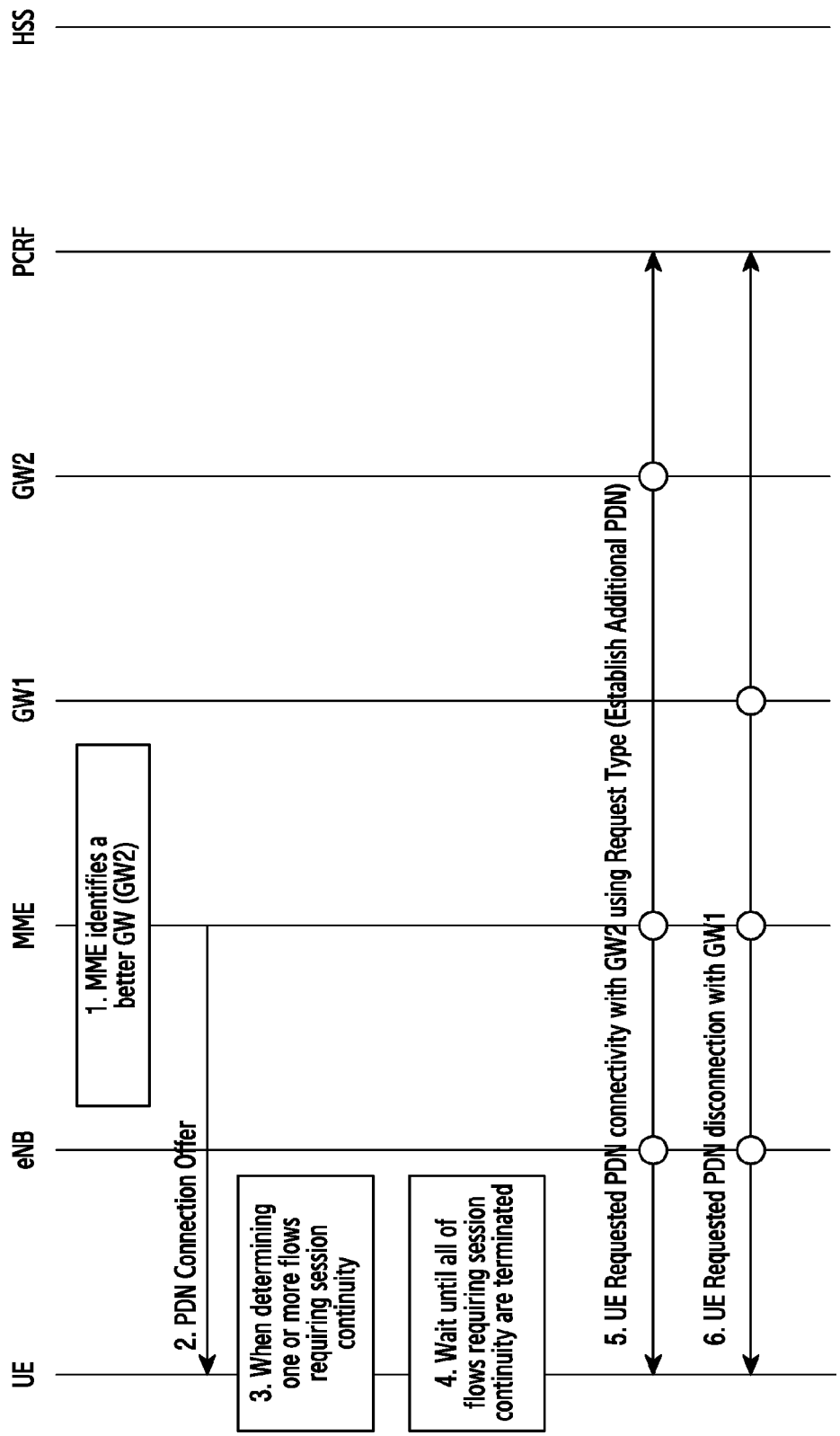
FIG. 17 depicts a flowchart of gateway change with one or more flows requiring session continuity during an extended PDN disconnection procedure but not using a higher-level mobility protocol according to various embodiments of the present disclosure.

FIG. 17 depicts a flowchart of GW change with one or more flows requiring session continuity during an extended PDN disconnection procedure but not using a higher-level mobility protocol according to various embodiments of the present disclosure.

In step 1, when an MME determines a better GW for serving a UE, the MME sends a PDN connection offer message to the UE in order to offer a new PDN connection in step 2.

When one or more flows requiring session continuity are determined in step 3, no message regarding GW change is transmitted to the MME until such flows are terminated in step 4.

When the blocking flow is terminated, PDN connection (second PGW) and PDN disconnection (first PGW) procedures are used according to the standard. In so doing, when PDN connection is requested, information indicating additional PDN establishment can be included. The information can inform the MME that the UE will establish a connection with an offered GW (the same GW as an MME determined prior to sending the PDN connection offer message, or another GW determined by the MME after that). A new GW can use the same PDN (i.e., the same APN) as one or more other GWs currently used. When not using the new GW at the time UE requested in step 5, the MME can reject the PDN connectivity procedure. In this case, the UE can maintain the current PDN connection (via the first PGW). That is, the UE does not attempt to terminate the PDN connection via the first PGW.

Although not shown in FIG. 17, an additional new message can be used between step 3 and step 4. This message can be a PDN connection hold message which is sent from the UE to the MME after the UE detects that it is not ready to establish a new PDN connection in step 3.

Figure 18:
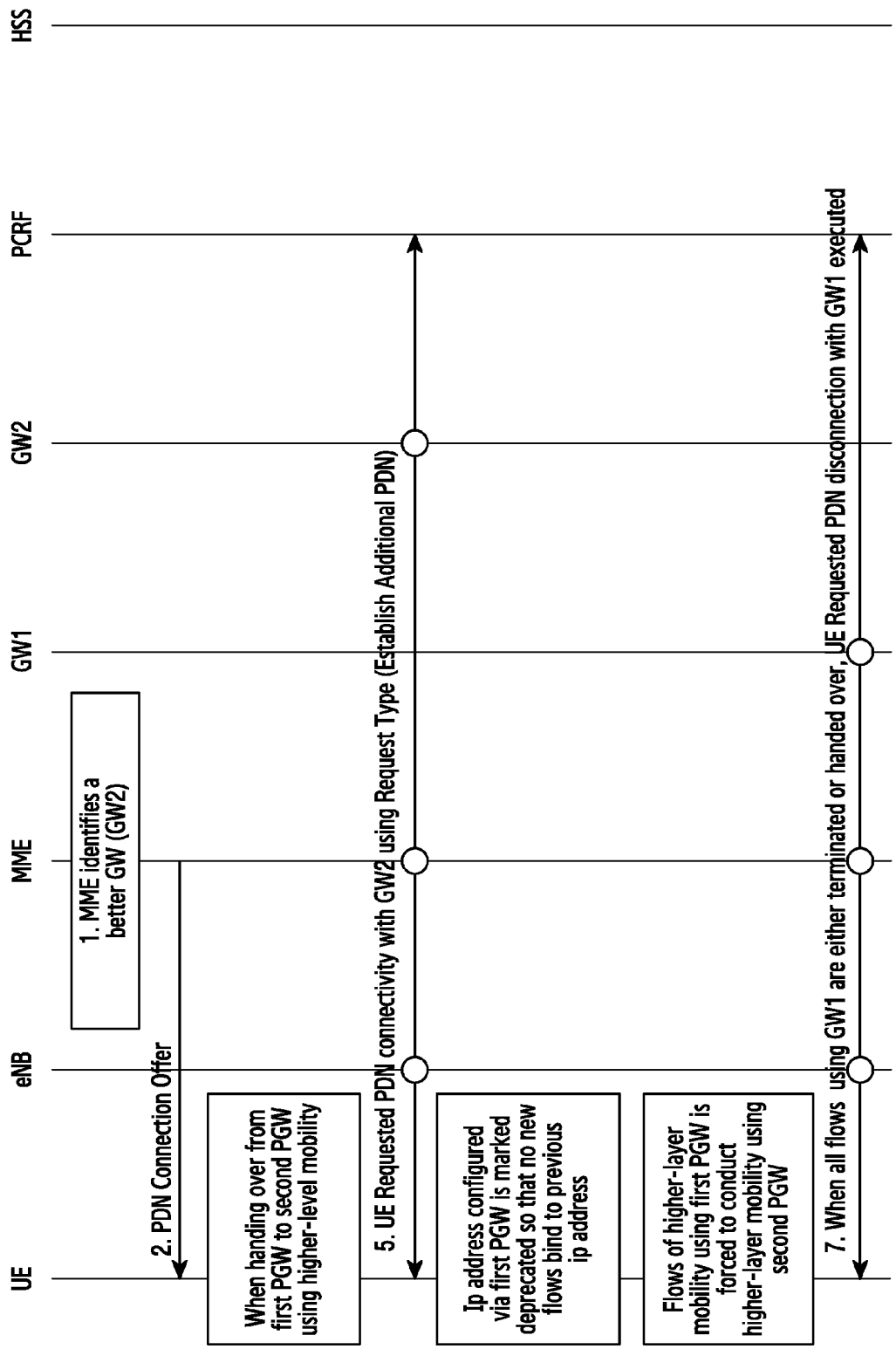
FIG. 18 depicts a flowchart of gateway change with one or more flows requiring session continuity during an extended PDN disconnection procedure and using a higher-level mobility protocol according to various embodiments of the present disclosure.

FIG. 18 depicts a flowchart of GW change with one or more flows requiring session continuity during an extended PDN disconnection procedure and using a higher-level mobility protocol according to various embodiments of the present disclosure.

In step 1, when an MME determines a better GW for serving a UE, the MME sends a PDN connection offer message to the UE in order to offer a new PDN connection in step 2.

In step 3, when one or more flows which can use dual PDN connections (i.e., when handover from a first PGW to a second PGW is feasible using high-layer mobility for a corresponding flow) and requires session continuity are determined, PDN connection (second PGW) is performed according to the standard procedure in step 4. In so doing, when PDN connection is requested, information indicating additional PDN establishment can be included. A new GW can use the same PDN (i.e., the same APN) as one or more other GWs currently used.

Upon the establishment of the additional PDN connection, an IP address configured for the existing PDN connection (first PGW) is marked deprecated, so that new flows created after the marking are not bound to the previous IP address. Instead, an IP address configured for the new PDN connection (second PGW) is used.

The UE forces the flow which executes the higher-layer mobility protocols and using the first PGW to perform higher-layer handover, so as to stop using the first PGW (step 6).

When all of flows using the first PGW are either terminated or handed over to the second PGW, the UE terminates the PDN connection via the first PGW in step 7.

Figure 19:
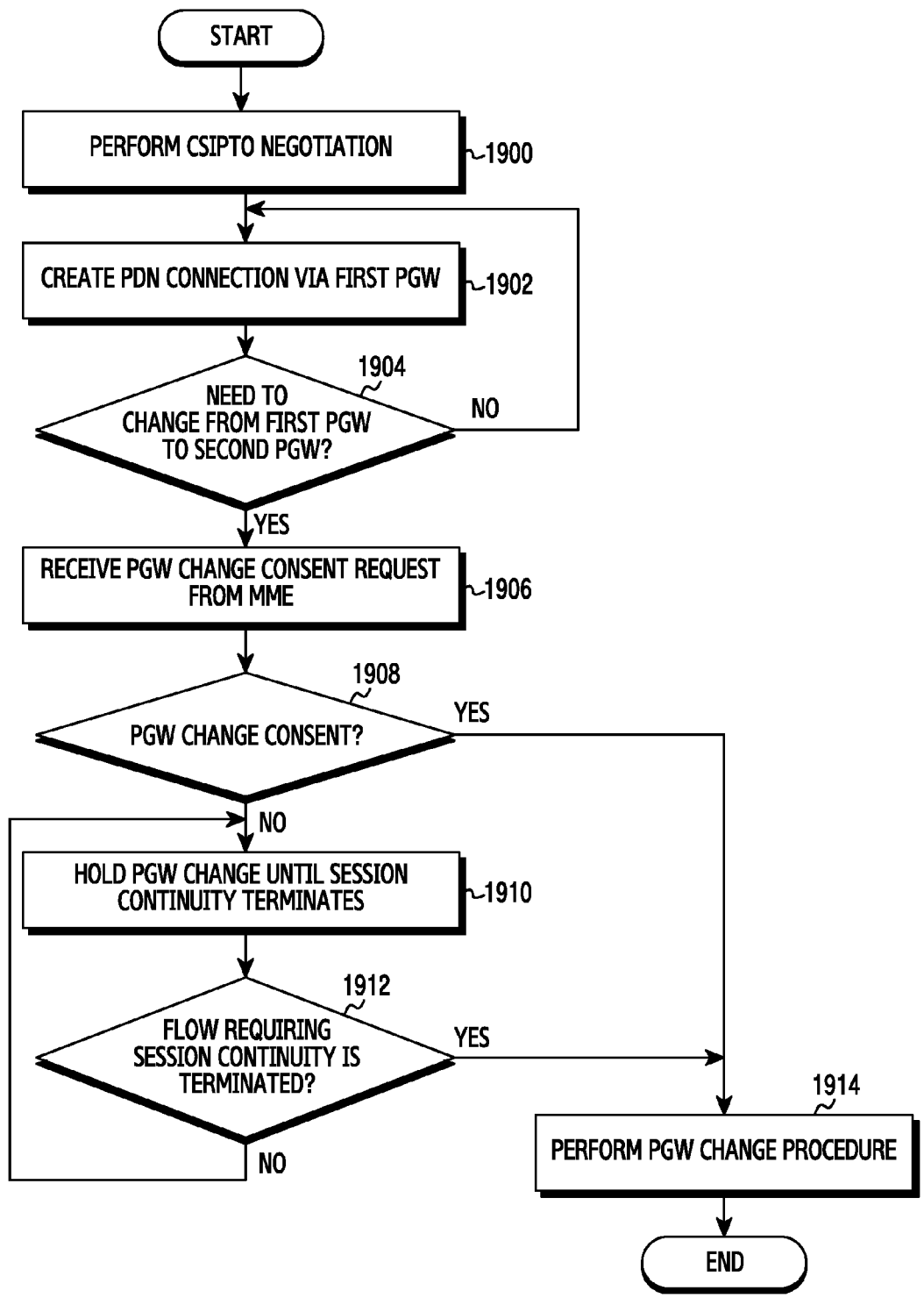
FIG. 19 depicts a flowchart of gateway change of a UE according to one embodiment of the present disclosure.

FIG. 19 depicts a flowchart of GW change of a UE according to one embodiment of the present disclosure.

Referring to FIG. 19, the UE can perform CSIPTO capability negotiation with an MME in step 1900. For example, the UE can notify the CSIPTO functionality to the MME and receive authorization for the CSIPTO function.

The UE can establish a PDN connection via a first PGW according to the standard PDN connection procedure in step 1902.

Next, when needing to change from the first PGW to a second PGW in step 1904, the UE can receive a PGW change consent from the MME in step 1906.

Next, the UE can determine whether to consent to the PGW change in step 1908. For example, when there is no flow for keeping session continuity, the UE can consent to the PGW change. When there is at least one flow for keeping the session continuity, the UE may not consent to the PGW change.

Further, the UE can send a response message of the PGW change consent to the MME in step 1908.

When not consenting to the PGW change, the UE can hold the PGW change until the flow keeping the session continuity is terminated in step 1910 and step 1920. For example, to hold the PGW change, the UE can send a Negative ACK (NACK) message of the PGW change consent. In various embodiments, the response message of the PGW change consent may not be transmitted to the MME.

By contrast, when consenting to the PGW change, the UE can perform the PGW change procedure according to a corresponding procedure in step 1914.

Figure 20:
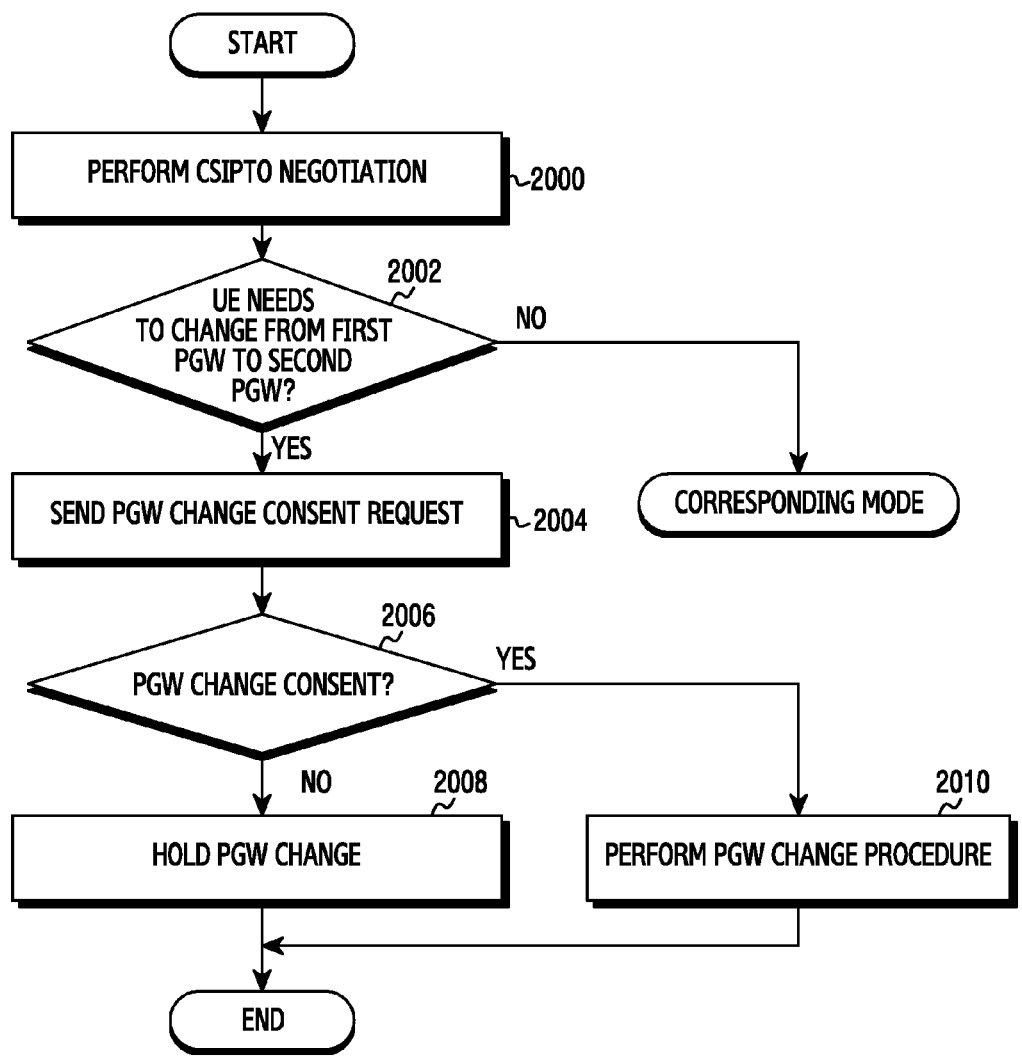
FIG. 20 depicts a flowchart of gateway change of a user MME according to one embodiment of the present disclosure.

FIG. 20 depicts a flowchart of GW change of a user MME according to one embodiment of the present disclosure.

Referring to FIG. 20, the MME can perform CSIPTO capability negotiation with respect to a UE in step 2000. For example, the MME can receive CSIPTO functionality from the UE and provide authorization for the CSIPTO function.

Next, the MME can determine whether the UE needs to change the PGW from a first PGW to a second PGW in step 2002.

When not requiring the PGW change, the MME can perform a corresponding mode. For example, the corresponding mode can maintain the PDN connection via the current PGW.

When requiring the PGW change, the MME can send a PGW change consent request to the UE in step 2004.

Next, when the UE does not consent to the PGW change in step 2006, the MME can hold the PGW change until a flow keeping session continuity is terminated in the UE in step 2008.

By contrast, when the UE consents to the PGW change in step 2006, the MME can execute the PGW change according to a corresponding procedure in step 2010.

Figure 21:
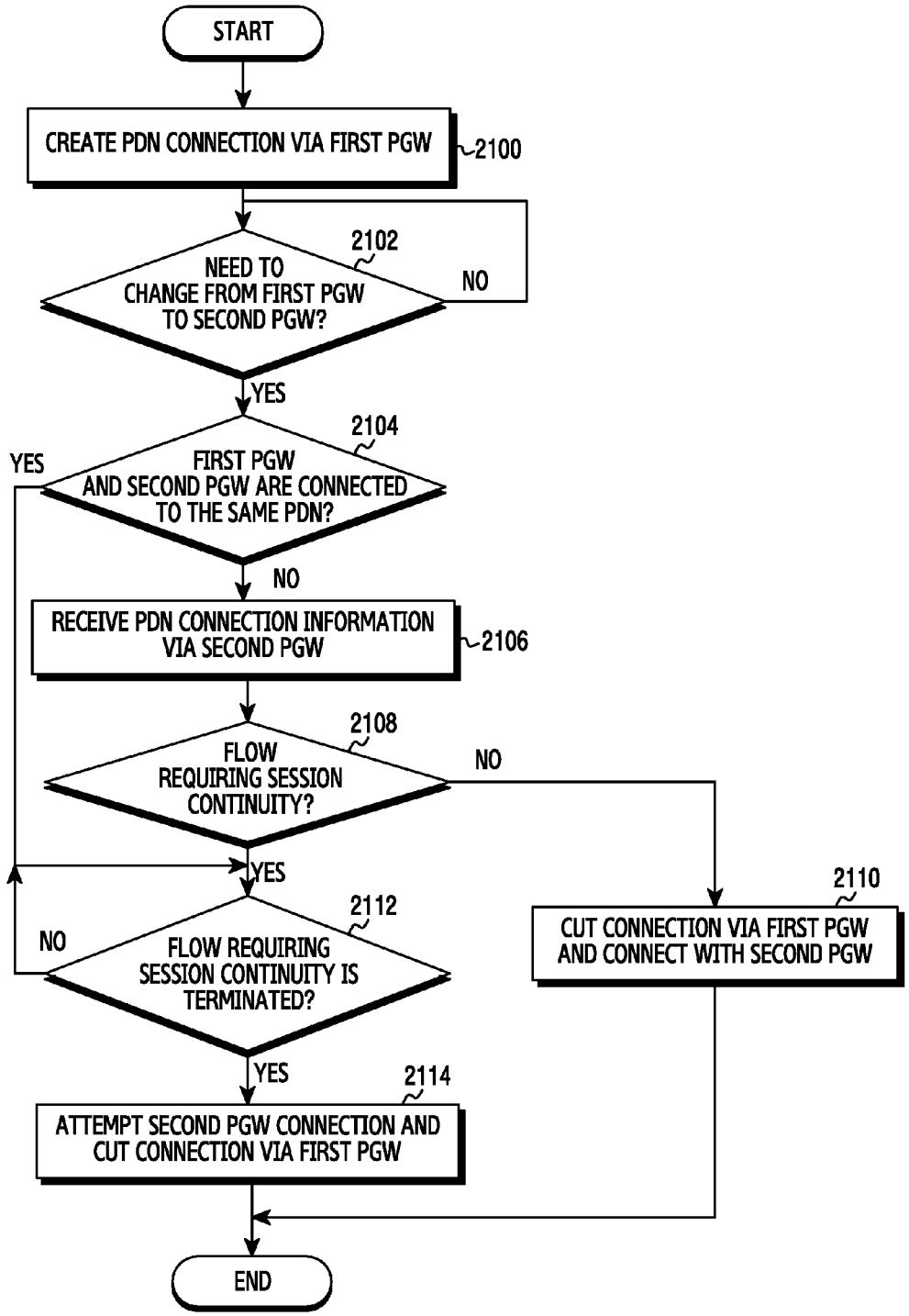
FIG. 21 depicts a flowchart of gateway change of a UE according to another embodiment of the present disclosure.

FIG. 21 depicts a flowchart of GW change of a UE according to another embodiment of the present disclosure.

Referring to FIG. 21, the UE can establish a PDN connection via a first PGW in step 2100.

Next, when needing to change from the first PGW to a second PGW in step 2102, the UE can determine whether the first PGW and the second PGW are connected to the same PDN in step 2104.

When the first PGW and the second PGW are connected to the same PDN, the UE goes to step 2112. When the first PGW and the second PGW are not connected to the same PDN, the UE goes to step 2106.

The UE can receive information about the PDN connection via the second PGS in step 2106. That is, the UE can receive an additional PDN connection offer from the MME.

Next, the UE determines whether there is a flow keeping session continuity in step 2108. For example, based on whether there is a flow keeping session continuity, the UE can determine whether to accept an additional PDN connection offer. For example, when there is no flow keeping session continuity, the UE can cut the PDN connection via the first PGW and then create a PDN connection via the second PGW. When there is a flow keeping session continuity, the UE can create a PDN connection via the second PGW and then determine whether to cut the PDN connection via the first PGW.

When there is a flow keeping session continuity, the UE waits until the flow keeping session continuity is terminated in step 2112. When the flow keeping session continuity terminates, the UE can create a PDN connection via the second PGW connection and then cut the PDN connection via the first PGW in step 2114.

By contrast, when there is no flow keeping session continuity, the UE can cut the PDN connection via the first PGW and then create a PDN connection via the second PGW connection in step 2110.

Figure 22:
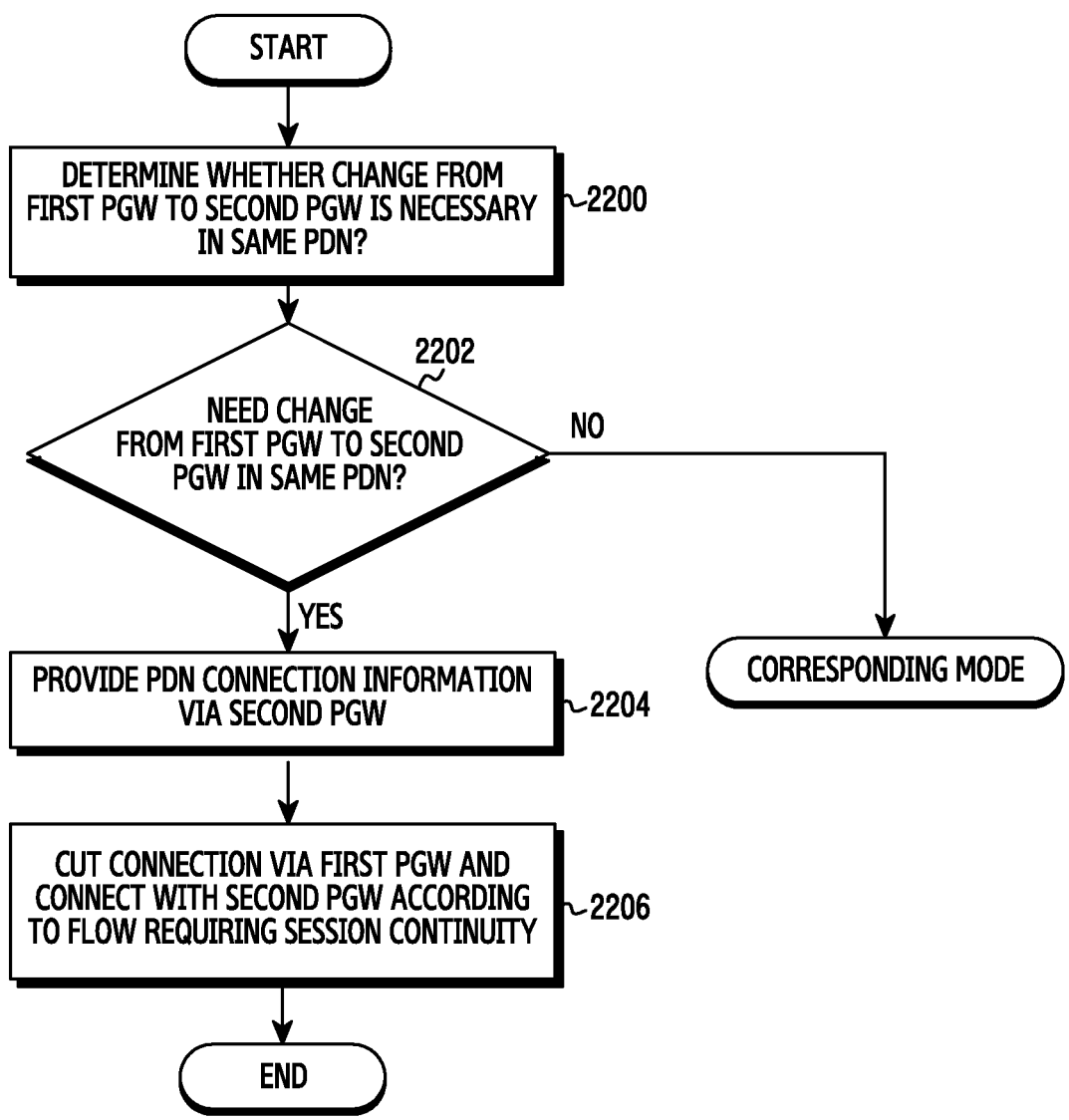
FIG. 22 depicts a flowchart of gateway change of an MME according to another embodiment of the present disclosure.

FIG. 22 depicts a flowchart of GW change of an MME according to another embodiment of the present disclosure.

Referring to FIG. 22, the MME can determine whether a UE needs to change its PGW from a first PGW to a second PGW in the same PDN in step 2200.

When not requiring the PGW change in step 2202, the MME can perform a corresponding mode. For example, the corresponding mode can keep a PDN connection via a current PGW.

When requiring the PGW change in step 2202, the MME can send a PGW change consent request to the UE.

Next, when the UE does not consent to the PGW change in step 2202, the MME can send PDN connection information via the second PGW to the UE in step 2204. That is, the MME can send an additional PDN connection offer to the UE.

Next, the MME can cut the connection via the first PGW and connect with the second PGW according to the flow keeping session continuity.

In various embodiments of the present disclosure, an operating method of a UE for supporting gateway change can include creating a PDN connection using a first gateway; receiving an additional PDN connection request using a second gateway during the PDN connection; and setting the additional PDN connection using the second gateway by considering at least one of whether at least one flow requiring session continuity is set and whether a protocol for handing over at least one flow requiring the session continuity from the first gateway to the second gateway is supported.

When at least one flow requiring the session continuity is not set, setting the additional PDN connection using the second gateway can cut the PDN connection using the first gateway and create an additional PDN connection using the second gateway.

When at least one flow requiring the session continuity is set and the protocol for handing over at least one flow requiring the session continuity from the first gateway to the second gateway is not supported, setting the additional PDN connection using the second gateway can cut the PDN connection using the first gateway and create an additional PDN connection using the second gateway after at least one flow requiring the session continuity is terminated.

When at least one flow requiring the session continuity is set and the protocol for handing over at least one flow requiring the session continuity from the first gateway to the second gateway is supported, setting the additional PDN connection using the second gateway can create an additional PDN connection using the second gateway and then cut the PDN connection using the first gateway.

Figure 23:
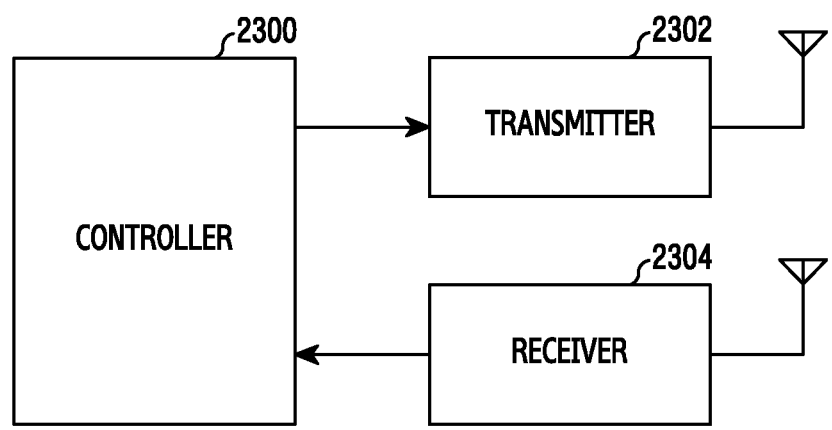
FIG. 23 is a block diagram of a UE according to various embodiments of the present disclosure.

FIG. 23 is a block diagram of a UE according to various embodiments of the present disclosure.

Referring to FIG. 23, the UE can include a controller 2300, a transmitter 2302, and a receiver 2304.

The controller 2300 controls and processes overall operations of the UE. In particular, the controller 2300 controls a GW change procedure according to one embodiment and another embodiment. For example, the controller 2300 can control the operations for the GW change procedure as shown in FIG. 4 through FIG. 18.

The transmitter 2302 and the receiver 2304 processes signal transmission and reception under control of the controller 2300. In particular, the transmitter 2302 and the receiver 2304 can transmit and receive signals to and from a network entity (e.g., MME) via a base station for the sake of the UE's GW change procedure.

In more detail, the receiver 2304 receives a message requesting the consent for the GW change from the network entity.

The transmitter 2302 can send a response message of the GW change consent to the network entity according to whether at least one flow requiring session continuity is set.

In so doing, when at least one flow requiring the session continuity is set, the network entity can hold the GW change based on the response message.

The controller 2300 can determine whether at least one flow requiring the session continuity is terminate, and send a notification message indicating the termination of the at least one flow requiring the session continuity, to the network entity. In response to the notification message, the network entity can perform the GW change procedure on hold.

Herein, when at least one flow requiring the session continuity is not set, the network entity can perform the GW change procedure based on the response message.

The GW change can be conducted within the same PDN.

The negotiation between the UE and the network entity for the GW change can be conducted during the detach procedure.

Figure 24:
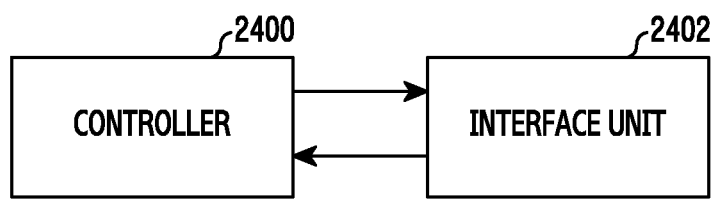
FIG. 24 is a block diagram of an MME according to various embodiments of the present disclosure.

FIG. 24 is a block diagram of an MME according to various embodiments of the present disclosure.

Referring to FIG. 24, the MME can include a controller 24000 and an interface unit 2402.

The controller 2400 controls and processes overall operations of the UE. In particular, the controller 2300 controls a GW change procedure according to one embodiment and another embodiment. For example, the controller 2300 can control the operations for the GW change procedure as shown in FIG. 4 through FIG. 18.

The interface unit 2402 processes signal transmission and reception under control of the controller 2400. In particular, the interface unit 2402 can transmit and receive signals to and from at least one UE via a base station for the sake of the GW change procedure.

In more detail, the controller 2400 determines whether the GW change is needed. The interface unit 2402 can send to the UE a message requesting to consent to the GW change, and receive from the UE a response message of the GW change consent according to whether at least one flow requiring session continuity is set.

When at least one flow requiring the session continuity is set, the controller 2400 can hold the GW change based on the response message.

The interface unit 2402 receives a notification message indicating termination of at least one flow requiring the session continuity, from the UE.

In response to the notification message, the controller 2400 can perform the GW change procedure on hold.

When at least one flow requiring the session continuity is not set, the controller 2400 can perform the GW change procedure based on the response message.

When the UE does not consent to the GW change, the controller 2400 can ignore a response message where the UE does not consent to the GW change, based on at least one of load balancing and network operator policy.

While the invention has been shown and described with reference to certain exemplary embodiments thereof, those of ordinary skill in the art will recognize that various changes and modifications of the embodiments described herein can be made without departing from the scope and spirit of the invention.

The operations according to embodiments of the present disclosure can be realized by the single controller. In this case, program instructions for executing the operations realized by various computers can be recorded on a computer-readable medium. The computer-readable medium can include program instructions, data files, and data structures, alone or in combination. The program instructions may be specially designed and configured or known to those of ordinary skilled in the art. Examples of the computer-readable medium can include a hard disk, a floppy disk and a magnetic medium such as a magnetic tape, an optical recording medium such as Compact Disc (CD)-Read Only Memory (ROM) or a Digital Versatile Disc (DVD), magneto-optical medium such as floptical disk, and hardware devices specially configured to store and execute program instructions such as ROM, Random Access Memory (RAM), and flash memory. Examples of the program instructions can include not only machine code made by a compiler but also high-level language code executable by a computer using an interpreter. When all or part of a base station or a relay explained in the present disclosure is realized as a computer program, a computer-readable recording medium storing the computer program is also included in the present disclosure. One of ordinary skill in the art would recognize other combinations are possible. Accordingly, the invention is intended to be embraced by all the other replacement, modifications and variations that fall within the scope of the following claims.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal, the method comprising:
   receiving, from a network entity, a message comprising a request regarding a gateway change;
   identifying whether at least one flow requiring a session continuity is set in response to the request; and
   transmitting, to the network entity, a response message for requesting to hold the gateway change based on whether the at least one flow requiring the session continuity is set.

2. The method of claim 1, further comprising:
   identifying whether at least one flow requiring the session continuity is terminated; and
   transmitting a notification message indicating that at least one flow requiring the session continuity is terminated, to the network entity,
   wherein the notification message indicates that the gateway change procedure put on hold by the network entity is performed.

3. The method of claim 1, wherein, the at least one flow requiring the session continuity is not set, the gateway change procedure is performed, by the network entity.

4. The method of claim 1, wherein the gateway change is performed in the same Packet Data Network (PDN).

5. The method of claim 1, further comprising:
   performing a negotiation between the terminal and the network entity for the gateway change during the detach procedure.

6. The method of claim 1, further comprising:
   transmitting, to the network entity, a notification message indicating that the terminal does not consent to the gateway change,
   wherein the gateway change is hold by the network entity in response to the notification message.

7. The method of claim 1, wherein transmitting the response message comprises:
   transmitting to the network entity, if the terminal has no flow requiring the session continuity, a response message indicating consent to the gateway change.

8. A method for operating a network entity, the method comprising:
- identifying whether gateway change is required;
- transmitting, to a terminal, a message comprising a request regarding a gateway change; and
- receiving, from the terminal, a response message for requesting to hold the gateway change based on whether the at least one flow requiring the session continuity is set in the terminal.

9. The method of claim 8, further comprising:
- receiving a notification message indicating that at least one flow requiring the session continuity is terminated, from the terminal; and
- performing, in response to the notification message, the gateway change procedure put on hold.

10. The method of claim 8, wherein, the at least one flow requiring the session continuity is not set, performing the gateway change procedure based on the response message.

11. The method of claim 8, further comprising:
- if the terminal does not consent to the gateway change, ignoring a response message where the terminal does not consent to the gateway change, based on at least one of load balancing and network operator policy.

12. The method of claim 8, further comprising:
- performing a negotiation between the terminal and the network entity for the gateway change during the detach procedure.

13. The method of claim 8, further comprising:
- receiving, from the terminal, a notification message indicating that the terminal does not consent to the gateway change; and
- holding the gateway change in response to the notification message.

14. The method of claim 8, wherein receiving the response message comprises:
- receiving, from the terminal if the terminal has no flow requiring the session continuity, a response message indicating consent to the gateway change.

15. A terminal comprising:
- at least one transceiver; and
- at least one processor operatively coupled to the at least one transceiver, wherein the at least one processor is configured to:
  - control to receive, from a network entity, a message comprising a request regarding a gateway change,
  - identify whether at least one flow requiring a session continuity is set in response to the request, and
  - control to transmit, to the network entity, a response message for requesting to hold the gateway change based on whether the at least one flow requiring the session continuity is set.

16. The terminal of claim 15, wherein the at least one processor is further configured to:
- identify whether at least one flow requiring the session continuity is terminated; and
- control to transmit a notification message indicating that at least one flow requiring the session continuity is terminated, to the network entity,
- wherein, the notification message indicates that the network entity performs the gateway change procedure put on hold by the network entity.

17. The terminal of claim 15, wherein, the at least one flow requiring the session continuity is not set, the gateway change procedure is performed.

18. The terminal of claim 15, wherein the at least one processor is further configured to perform a negotiation between the terminal and the network entity for the gateway change during the detach procedure.

19. The terminal of claim 15, wherein the at least one processor is further configured to:
- control to transmit, to the network entity, a notification message indicating that the terminal does not consent to the gateway change,
- wherein the gateway change is hold by the network entity in response to the notification message.

20. The terminal of claim 15, wherein the at least one processor is further configured to:
- control to transmit to the network entity, if the terminal has no flow requiring the session continuity, a response message indicating consent to the gateway change.

* * * * *